(12) United States Patent
Cao et al.

(10) Patent No.: US 12,399,892 B2
(45) Date of Patent: Aug. 26, 2025

(54) SYSTEM AND METHOD FOR TRANSFERABLE NATURAL LANGUAGE INTERFACE

(71) Applicant: ROYAL BANK OF CANADA, Toronto (CA)

(72) Inventors: Yanshuai Cao, Toronto (CA); Peng Xu, Toronto (CA); Keyi Tang, Vancouver (CA); Wei Yang, Toronto (CA); Wenjie Zi, Toronto (CA); Teng Long, Toronto (CA); Jackie Chit Kit Cheung, Toronto (CA); Chenyang Huang, Toronto (CA); Lili Mou, Toronto (CA); Hamidreza Shahidi, Toronto (CA); Ákos Kádár, Toronto (CA)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 17/508,914

(22) Filed: Oct. 22, 2021

(65) Prior Publication Data

US 2022/0129450 A1 Apr. 28, 2022

Related U.S. Application Data

(60) Provisional application No. 63/126,887, filed on Dec. 17, 2020, provisional application No. 63/104,789, filed on Oct. 23, 2020.

(51) Int. Cl.
*G06F 7/00* (2006.01)
*G06F 16/242* (2019.01)

(52) U.S. Cl.
CPC ........ *G06F 16/2433* (2019.01); *G06F 16/243* (2019.01)

(58) Field of Classification Search
CPC .............. G06F 16/2433; G06F 16/243; G06F 16/24522; G06F 16/3329; G06F 16/90332; G06F 16/3344
See application file for complete search history.

(56) References Cited

U.S. PATENT DOCUMENTS

| 5,265,014 | A | * | 11/1993 | Haddock | ............... | G06F 40/253 |
| | | | | | | 704/9 |
| 5,386,556 | A | * | 1/1995 | Hedin | ............... | G06F 16/24526 |
| 5,884,302 | A | * | 3/1999 | Ho | ............... | G09B 7/04 |
| 9,501,585 | B1 | * | 11/2016 | Gautam | ............... | G06F 16/3328 |

(Continued)

OTHER PUBLICATIONS

Jimmy Lei Ba et al., 2016, Layer normalization, arXiv preprint arXiv:1607.06450.

(Continued)

*Primary Examiner* — Mohammed R Uddin
(74) *Attorney, Agent, or Firm* — Norton Rose Fulbright Canada LLP

(57) ABSTRACT

A computer system and method for answering a natural language question is provided. The system comprises at least one processor and a memory storing instructions which when executed by the processor configure the processor to perform the method. The method comprises receiving a natural language question, generating a SQL query based on the natural language question, generating an explanation regarding a solution to the natural language question as answered by the SQL query, and presenting the solution and the explanation.

20 Claims, 14 Drawing Sheets

(56) References Cited

U.S. PATENT DOCUMENTS

| | | | |
|---|---|---|---|
| 9,830,315 B1* | 11/2017 | Xiao | G06F 40/30 |
| 11,561,969 B2* | 1/2023 | Kim | G06F 16/284 |
| 2001/0013036 A1* | 8/2001 | Judicibus | G06F 16/3322 |
| | | | 707/999.005 |
| 2003/0200206 A1* | 10/2003 | de Judicibus | G06F 16/2425 |
| 2007/0022109 A1* | 1/2007 | Imielinski | G06F 16/3329 |
| 2008/0235199 A1* | 9/2008 | Li | G06F 16/243 |
| 2011/0093486 A1* | 4/2011 | Lin | G06F 16/2448 |
| | | | 707/E17.05 |
| 2011/0320187 A1* | 12/2011 | Motik | G06F 16/3344 |
| | | | 704/9 |
| 2012/0173476 A1* | 7/2012 | Rizvi | G06F 16/2465 |
| | | | 707/600 |
| 2015/0142704 A1* | 5/2015 | London | G06Q 30/0613 |
| | | | 706/11 |
| 2016/0180438 A1* | 6/2016 | Boston | G06Q 30/0282 |
| | | | 705/26.7 |
| 2016/0260433 A1* | 9/2016 | Sumner | G06F 40/30 |
| 2017/0025120 A1* | 1/2017 | Dayan | G06F 16/3338 |
| 2017/0075953 A1* | 3/2017 | Bozkaya | G06F 16/24522 |
| 2017/0083615 A1* | 3/2017 | Boguraev | G06F 40/211 |
| 2018/0095962 A1* | 4/2018 | Anderson | G06F 16/2365 |
| 2018/0210883 A1* | 7/2018 | Ang | G06F 40/284 |
| 2018/0336798 A1* | 11/2018 | Malawey | G08B 6/00 |
| 2018/0349377 A1* | 12/2018 | Verma | G06N 3/045 |
| 2019/0205726 A1* | 7/2019 | Khabiri | G06N 5/041 |
| 2019/0243831 A1* | 8/2019 | Rumiantsau | G10L 15/26 |
| 2019/0272296 A1* | 9/2019 | Prakash | G06F 16/243 |
| 2020/0034362 A1* | 1/2020 | Galitsky | G06F 16/24522 |
| 2020/0257679 A1* | 8/2020 | Sheinin | G06N 3/08 |
| 2022/0067281 A1* | 3/2022 | Hu | G06F 40/30 |
| 2023/0025842 A1* | 1/2023 | Nandikotkur | H04L 51/234 |
| 2023/0026764 A1* | 1/2023 | Karashchuk | G06Q 10/109 |
| 2023/0026794 A1* | 1/2023 | Hwang | G06F 40/40 |

OTHER PUBLICATIONS

DongHyun Choi et al., 2020, Ryansql: Recursively applying sketch-based slot fillings for complex text-to-sql in cross-domain databases, arXiv preprint arXiv:2004.03125.

Chelsea Finn et al., Model-agnostic meta-learning for fast adaptation of deep networks, In ICML.

Xavier Glorot et al., Understanding the difficulty of training deep feed forward neural networks, In Proceedings of the thirteenth international conference on artificial intelligence and statistics, pp. 249-256.

Jiaqi Guo et al., 2019, Towards complex text-to-sql in cross-domain database with intermediate representation, ACL.

Sepp Hochreiter et al., 1997, Long short-term memory, Neural computation, 9(8):1735-1780.

Xiao Shi Huang et al., 2020, Improving transformer optimization through better initialization, ICML.

Preetum Nakkiran et al., 2019, Deep double descent: Where bigger models and more data hurt, In International Conference on Learning Representations.

Peter Shaw et al., 2018. Self-attention with relative position representations, In Proceedings of the 2018 Conference of the North American Chapter of the Association for Computational Linguistics: Human Language Technologies, vol. 2 (Short Papers), pp. 464-468.

Nitish Srivastava et al., 2014, Dropout: a simple way to prevent neural networks from overfitting, The journal of machine learning research, 15(1):1929-1958.

Christian Szegedy et al., 2016, Rethinking the inception architecture for computer vision, In Proceedings of the IEEE conference on computer vision and pattern recognition, pp. 2818-2826.

Ashish Vaswani et al., 2017, Attention is all you need, In Advances in neural information processing systems, pp. 5998-6008.

Bailin Wang et al., 2019, Rat-sql: Relation-aware schema encoding and linking for text-to-sql parsers, arXiv preprint arXiv:1911.04942.

Sam Wiseman et al., 2016, Sequence-to-sequence learning as beam-search optimization. arXiv preprint arXiv:1606.02960.

Zitong Yang et al., 2020, Rethinking bias-variance trade-off for generalization of neural networks, arXiv preprint arXiv:2002.11328.

Pengcheng Yin et al., 2018, Tranx: A transition-based neural abstract syntax parser for semantic parsing and code generation, arXiv preprint arXiv:1810.02720.

Tao Yu et al., 2018, Spider: A large-scale human-labeled dataset for complex and cross-domain semantic parsing and text-to-sql task, In Proceedings of the 2018 Conference on Empirical Methods in Natural Language Processing, pp. 3911-3921.

Hongyi Zhang et al., 2019, Fixup initialization: Residual learning with-out normalization, ICLR.

Anna Currey et al., 2017, Copied monolingual data improves low-resource neural machine translation, In Proceedings of the Second Conference on Machine Translation, pp. 148-156.

Diederik P. Kingma et al., 2014, Adam: A method for stochastic optimization, arXiv preprint arXiv:1412.6980.

Ahmed Elgohary et al., 2020, Speak to your parser: Interactive text-to-sql with natural language feedback, In Annual Conference of the Association for Computational Linguistics (ACL 2020).

Catherine Finegan-Dollak et al., 2018, Improving text-to-SQL evaluation methodology, In Proceedings of the 56th Annual Meeting of the Association for Computational Linguistics (vol. 1: Long Papers), pp. 351-360, Melbourne, Australia. Association for Computational Linguistics.

Victor Zhong et al., 2017, Seq2sql: Generating structured queries from natural language using reinforcement learning, arXiv preprint arXiv:1709.00103.

Tong Guo et al., 2020, Content enhanced bert-based text-to-sql generation.

G. Koutrika et al., 2010, Explaining structured queries in natural language, In 2010 IEEE 26th International Conference on Data Engineering (ICDE 2010), pp. 333-344.

F. Li et al., 2014, Nalir: an interactive natural language interface for querying relational databases, Proceedings of the 2014 ACM SIGMOD International Conference on Management of Data.

Xi Victoria Lin et al., 2020, Bridging textual and tabular data for cross-domain text-to-sql semantic parsing, arXiv preprint arXiv:2012.12627.

Axel-Cyrille Ngonga Ngomo et al., 2013, Sorry, i don't speak sparql: translating sparql queries into natural language, In WWW, pp. 977-988.

Ana-Maria Popescu et al., 2003, Towards a theory of natural language inter-faces to databases. In Proceedings of the 8th international conference on Intelligent user interfaces, pp. 149-157.

Ohad Rubin et al., 2020, Smbop: Semi-autoregressive bottom-up semantic parsing.

Yannis Ioannidis et al., 2009, Dbmss should talk back too, CoRR, abs/0909.1786.

Alane Suhr, 2020, Exploring unexplored generalization challenges for cross-database semantic parsing, In Proceedings of the 58th Annual Meeting of the Association for Computational Linguistics, pp. 8372-8388, Online, Association for Computational Linguistics.

Kun Xu et al., 2018. SQL-to-text generation with graph-to-sequence model, In Proceedings of the 2018 Conference on Empirical Methods in Natural Language Processing, pp. 931-936, Brussels, Belgium, Association for Computational Linguistics.

P. Xu et al., 2020, Optimizing deeper transformers on small datasets: An application on text-to-sql semantic parsing, ArXiv, abs/2012.15355.

John M Zelle et al., 1996, Learning to parse database queries using inductive logic programming, In Proceedings of the national conference on artificial intelligence, pp. 1050-1055.

Jichuan Zeng et al., 2020, Photon: A robust cross-domain text-to-SQL system, In Proceedings of the 58th Annual Meeting of the Association for Computational Linguistics: System Demonstrations, pp. 204-214, Online, Association for Computational Linguistics.

Victor Zhong et al., 2020, Grounded adaptation for zero-shot executable semantic parsing, In Proceedings of the 2020 Confer-

(56) References Cited

OTHER PUBLICATIONS ence on Empirical Methods in Natural Language Processing (EMNLP), pp. 6869-6882, Online, Association for Computational Linguistics.
Peter Shaw et al., 2020, Compositional generalization and natural language variation: Can a semantic parsing approach handle both?, arXiv preprint arXiv:2010.12725.

* cited by examiner

SYSTEM AND METHOD FOR TRANSFERABLE NATURAL LANGUAGE INTERFACE

CROSS REFERENCE TO RELATED APPLICATIONS

This application is a non-provisional of, and claims all benefit, including priority, to U.S. Application No. 63/104,789, dated Oct. 23, 2020; and to U.S. Application No. 63/126,887, dated Dec. 17, 2020; both entitled SYSTEM AND METHOD FOR TRANSFERABLE NATURAL LANGUAGE INTERFACE, and incorporated herein in their entirety by reference.

FIELD

The present disclosure relates generally to natural language interfaces, and in particular to a system and method for transferable natural language interface.

INTRODUCTION

Natural language processing may be used to convert natural language sentences into SQL queries.

Today a vast amount of knowledge is hidden in structured datasets, not directly accessible to nontechnical users who are not familiar with the corresponding database query language like SQL or SPARQL. Natural language database interfaces (NLDB) enable everyday users to interact with databases. However, correctly translating natural language to executable queries is challenging, as it requires resolving all the ambiguities and subtleties of natural utterances for precise mapping. Furthermore, quick deployment and adoption for NLDB require zero-shot transfer to new databases without an indomain text-to-SQL parallel corpus, i.e. cross-database semantic parsing (SP), making the translation accuracy even lower. Finally, unlike in other NLP applications where partially correct results can still provide partial utility, a SQL query with a slight mistake could cause negative utility if trusted blindly or confusing to users.

SUMMARY

In one embodiment, there is provided a system for answering a natural language question. The system comprises at least one processor and a memory storing instructions which when executed by the processor configure the processor to receive a natural language question, generate a SQL query based on the natural language question, generate an explanation regarding a solution to the natural language question as answered by the SQL query, and present the solution and the explanation.

In another embodiment, there is provided a method of answering a natural language question. The method comprises receiving a natural language question, generating a SQL query based on the natural language question, generating an explanation regarding a solution to the natural language question as answered by the SQL query, and presenting the solution and the explanation.

In another embodiment, there is provided another system for answering a natural language question. The system comprises at least one processor and a memory storing instructions which when executed by the processor configure the processor to receive a natural language question, and when the question is not out-of-domain and not hard-to answer, generate a SQL query based on the natural language question, generate an explanation regarding a solution to the natural language question as answered by the SQL query, and present the solution and the explanation.

In another embodiment, there is provided another method of answering a natural language question. The method comprises receiving a natural language question, and when the question is not out-of-domain and not hard-to answer, generating a SQL query based on the natural language question, generating an explanation regarding a solution to the natural language question as answered by the SQL query, and presenting the solution and the explanation.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
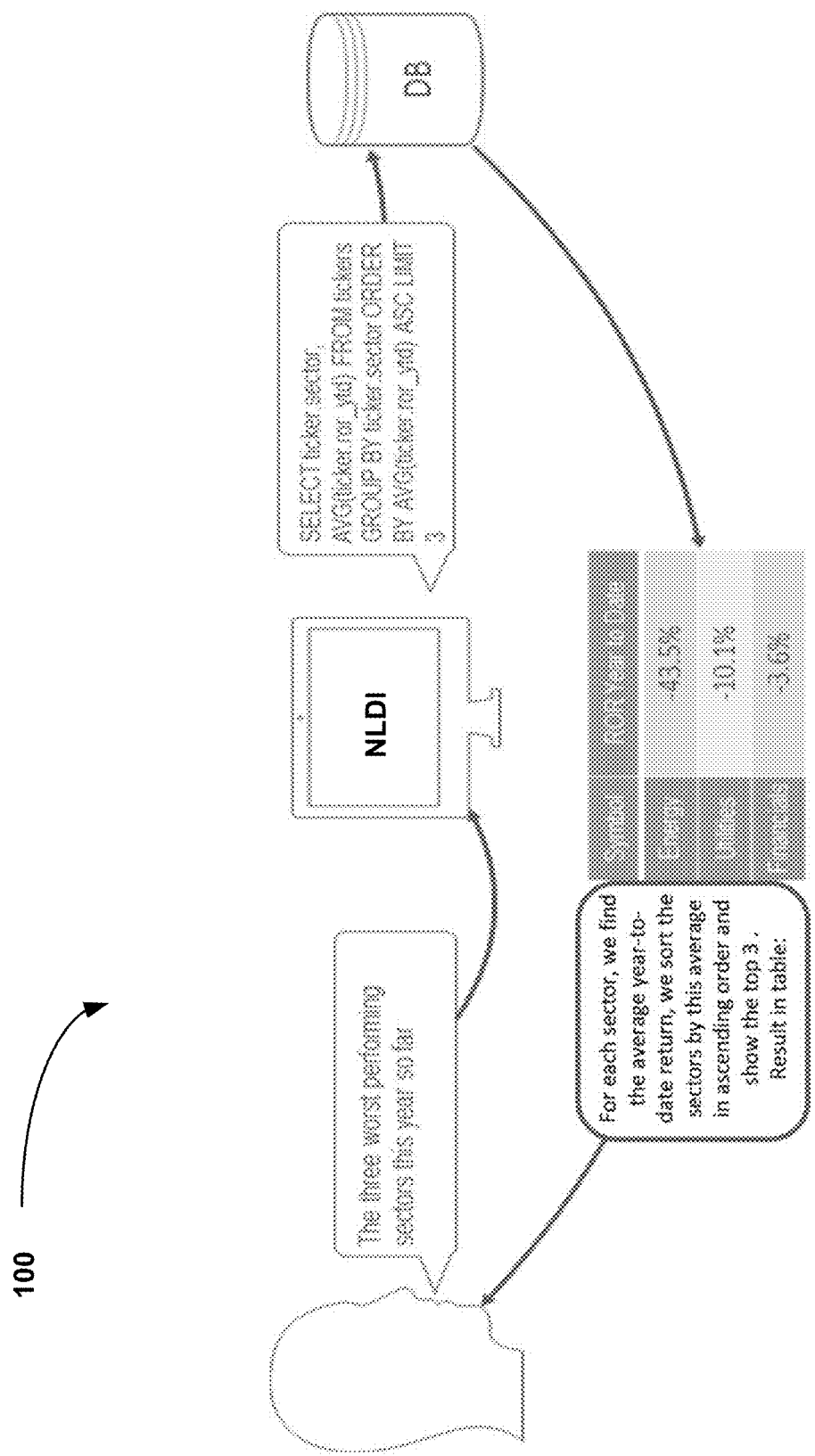
FIG. 1 illustrates an example of a user interaction with the natural language database interface system, in accordance with some embodiments.

Embodiments of methods, systems, and apparatus are described through reference to the drawings.

A natural language database interface (NLDB) can democratize data-driven insights for nontechnical users. However, existing Text-to-SQL semantic parsers cannot achieve high enough accuracy in the cross-database setting to allow good usability in practice. In some embodiments, an interactive system is designed where the SQL hypotheses in the beam are explained step-by-step in natural language, with their differences highlighted. The user can then compare and judge the hypotheses to select which one reflects their intention if any. The English explanations of SQL queries are produced by a high-precision natural language generation system based on synchronous grammars.

The recent Spider benchmark captures this cross-domain problem, and the current state-of-the-art methods merely achieve around 70% execution accuracy. Meanwhile, generalization to datasets collected under different protocols is even weaker. Finally, users generally have no way to know if the NLDB made a mistake except in very obvious cases. The high error rate combined with the overall system's opacity makes it hard for users to trust any output from the NLDB.

In some embodiments, a model with top-5 accuracy on Spider is 78:3%, significantly higher than the previous best single-model method at around 68%. Top-5 accuracy is the proportion of times when one of the top five hypotheses from beam-search inference is correct (in execution accuracy evaluation). For top-5 accuracy to be relevant in practice, a nontechnical user needs to be able to pick the correct hypothesis from the candidate list. To this end, a feedback system is designed that can unambiguously explain the top beam-search results while presenting the differences intuitively and visually. Users can then judge which, if any, of the parses correctly reflects their intentions. The explanation system uses a hybrid of two synchronous context-free grammars, one shallow and one deep. Together, they achieve good readability for the most frequent query patterns while near-complete coverage overall.

In some embodiment, a system is presented that is not only interpretable, but also a highly accurate cross-domain NLDB. Compared to previous executable semantic parsers, significant gains are achieved with a number of techniques, but predominantly by simplifying the learning problem in value prediction. The model only needs to identify the text span providing evidence for the ground-truth value. The noisy long tail text normalization step required for producing the actual value is offloaded to a deterministic search phase in post-processing.

Two steps towards a more robust NLDB include:
1. A state-of-the-art text-to-SQL parsing system with the best top-1 execution accuracy on the Spider development set.
2. A way to relax usability requirement from top-1 accuracy to top-k accuracy by explaining the different hypotheses in natural language with visual aids.

In some embodiments, a transferable natural language interface system for databases that allow non-technical users to interact with structured data without using SQL is provided. FIG. 1 illustrates an example of a user interaction with the natural language database interface system 100, in accordance with some embodiments.

In some embodiments, the natural language database interface system 100 comprises a semantic parser 222 which translates natural language questions to executable SQL queries, a safe guard module 224 to detect out-of-domain questions and hard-to-answer questions, a response generator 226 to present the queried results and give interpretable explanations to the end users, and a data acquisition process 228 to annotate and augment the dataset used for training models of the system. In some embodiments, the semantic parser 222 achieves a 72:5% exact match accuracy on the dev set of Spider, a popular cross-domain text-to-SQL benchmark, which is the state of the art as the time of filing.

Figure 2:
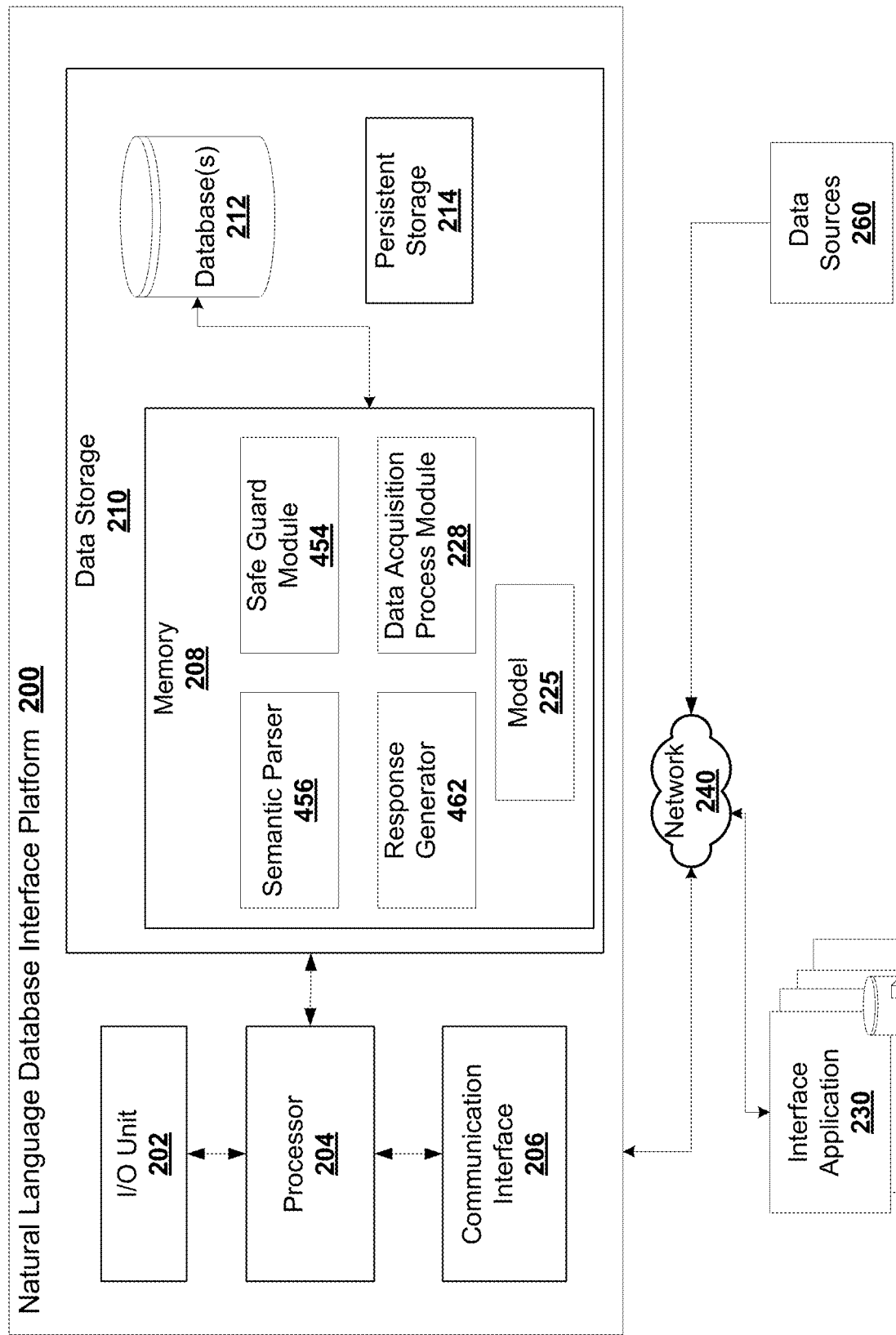
FIG. 2 illustrates, in a schematic diagram, an example of a natural language database interface platform, in accordance with some embodiments.

FIG. 2 illustrates, in a schematic diagram, an example of natural language database interface platform 200, in accordance with some embodiments. The platform 200 may be an electronic device connected to interface application 230 and data sources 260 via network 240. The platform 200 can implement aspects of the processes described herein.

The platform 200 may include a processor 204 and a memory 208 storing machine executable instructions to configure the processor 204 to receive a voice and/or text files (e.g., from I/O unit 202 or from data sources 260). The platform 200 can include an I/O Unit 202, communication interface 206, and data storage 210. The processor 204 can execute instructions in memory 208 to implement aspects of processes described herein.

The platform 200 may be implemented on an electronic device and can include an I/O unit 202, a processor 204, a communication interface 206, and a data storage 210. The platform 200 can connect with one or more interface applications 230 or data sources 260. This connection may be over a network 240 (or multiple networks). The platform 200 may receive and transmit data from one or more of these via I/O unit 202. When data is received, I/O unit 202 transmits the data to processor 204.

The I/O unit 202 can enable the platform 200 to interconnect with one or more input devices, such as a keyboard, mouse, camera, touch screen and a microphone, and/or with one or more output devices such as a display screen and a speaker.

The processor 204 can be, for example, any type of general-purpose microprocessor or microcontroller, a digital signal processing (DSP) processor, an integrated circuit, a field programmable gate array (FPGA), a reconfigurable processor, or any combination thereof.

The data storage 210 can include memory 208, database(s) 212 and persistent storage 214. Memory 208 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 210 can include memory 208, databases 212 (e.g., graph database), and persistent storage 214.

The communication interface 206 can enable the platform 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 200 can be operable to register and authenticate users (using a login, unique identifier, and password for example) prior to providing access to applications, a local network, network resources, other networks and network security devices. The platform 200 can connect to different machines or entities.

The data storage 210 may be configured to store information associated with or created by the platform 200. Storage 210 and/or persistent storage 214 may be provided using various types of storage technologies, such as solid state drives, hard disk drives, flash memory, and may be stored in various formats, such as relational databases, non-relational databases, flat files, spreadsheets, extended markup files, etc.

The memory 208 may include the semantic parser 456, the safe guard module 454, the response generator 462, the data acquisition process module 228, and a data model 225.

Figure 3A:
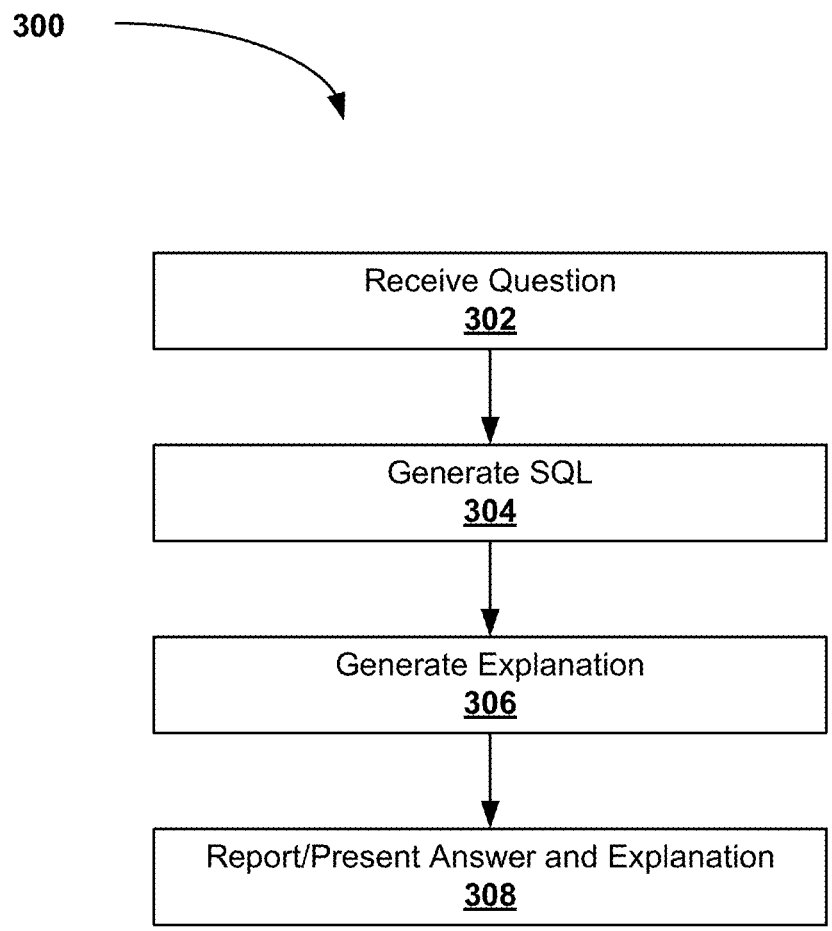
FIG. 3A illustrates, in a flowchart, an example of a method of performing a query on a natural language question, in accordance with some embodiments.

FIG. 3A illustrates, in a flowchart, an example of a method of performing a query on a natural language question 300, in accordance with some embodiments. The method 300 comprises receiving the question 302, generating a SQL query based on the question 304, generating an explanation 306 regarding the question including how it was answered, and reporting and/or presenting an answer associated with the SQL query and the generated explanation 308. Other steps may be added to the method 300.

Figure 3B:
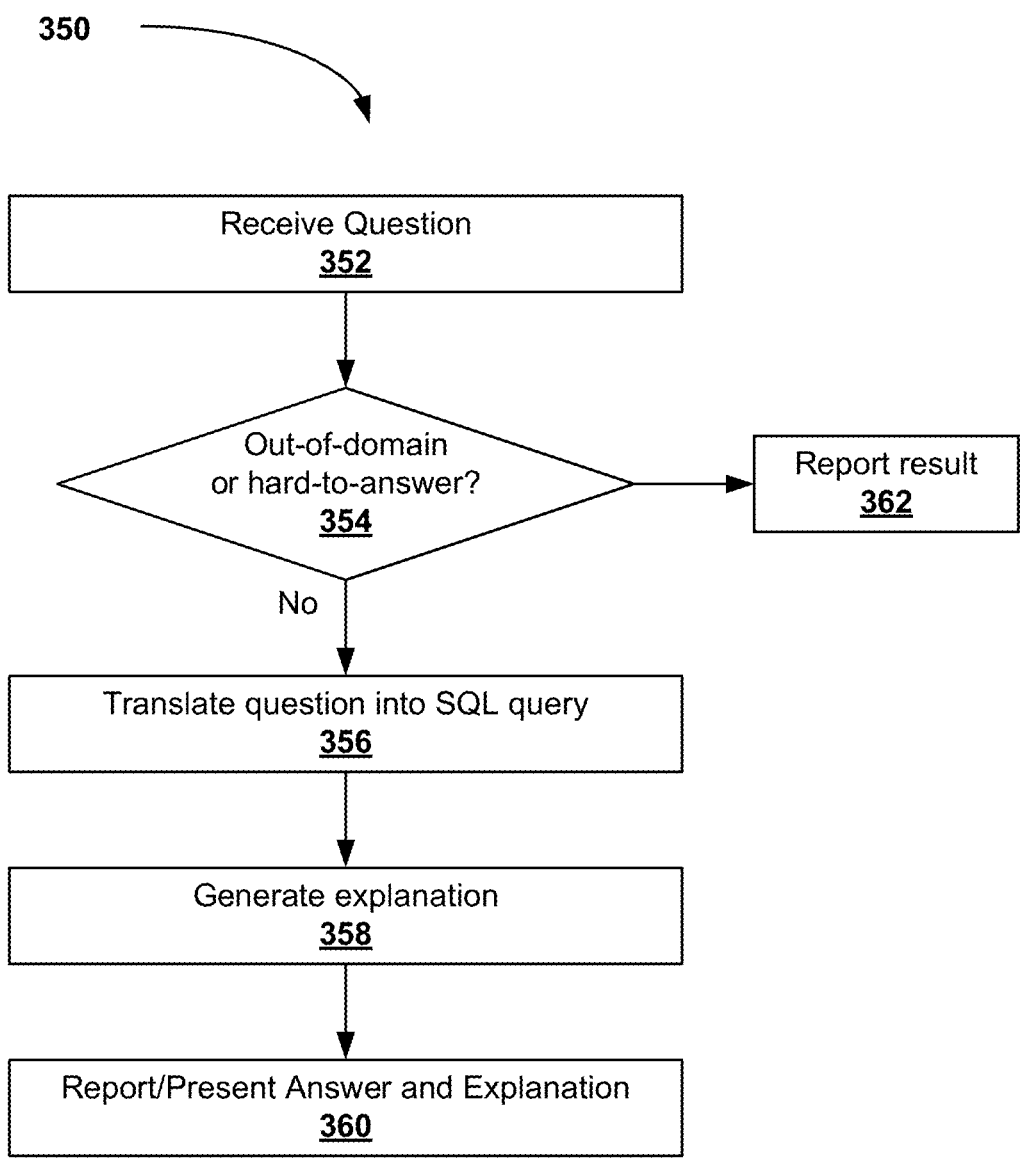
FIG. 3B illustrates, in a flowchart, another example of a method of performing a query on a natural language question, in accordance with some embodiments.

FIG. 3B illustrates, in a flowchart, another example of a method of performing a query on a natural language question 350, in accordance with some embodiments. The method 350 comprises receiving the question 352, and determining if the question is out-of-domain or hard-to answer 354. If so 354, then a corresponding report may be generated 362 and no further processing takes place. If not 354, then the question is translated into a SQL query 356, an explanation is generated 358 regarding the question including how it was answered, and an answer associated with the SQL query and the generated explanation are reported and/or presented 360. In some embodiments, the out-of-domain/hard-to-answer report is presented together with, or as a part of, the answer and explanation report. Other steps may be added to the method 300.

The natural language database system 100 may be considered reliable because it knows what it cannot answer using the safe-guard 224, while also allowing the user to verify the correctness of the answer by explaining step-by-step the query, which reflects whether they natural language database system's 100 interpretation of the user's question is correct.

The transferability of the natural language database system 100 is two-fold: (1) by learning a domain-agnostic representation, the prediction power of the semantic parser can be effectively transferred to the domains of interest; (2) the developed data acquisition process can be conveniently applied on different domains, enabling easy transfer when the domains of interest change.

Figure 4:
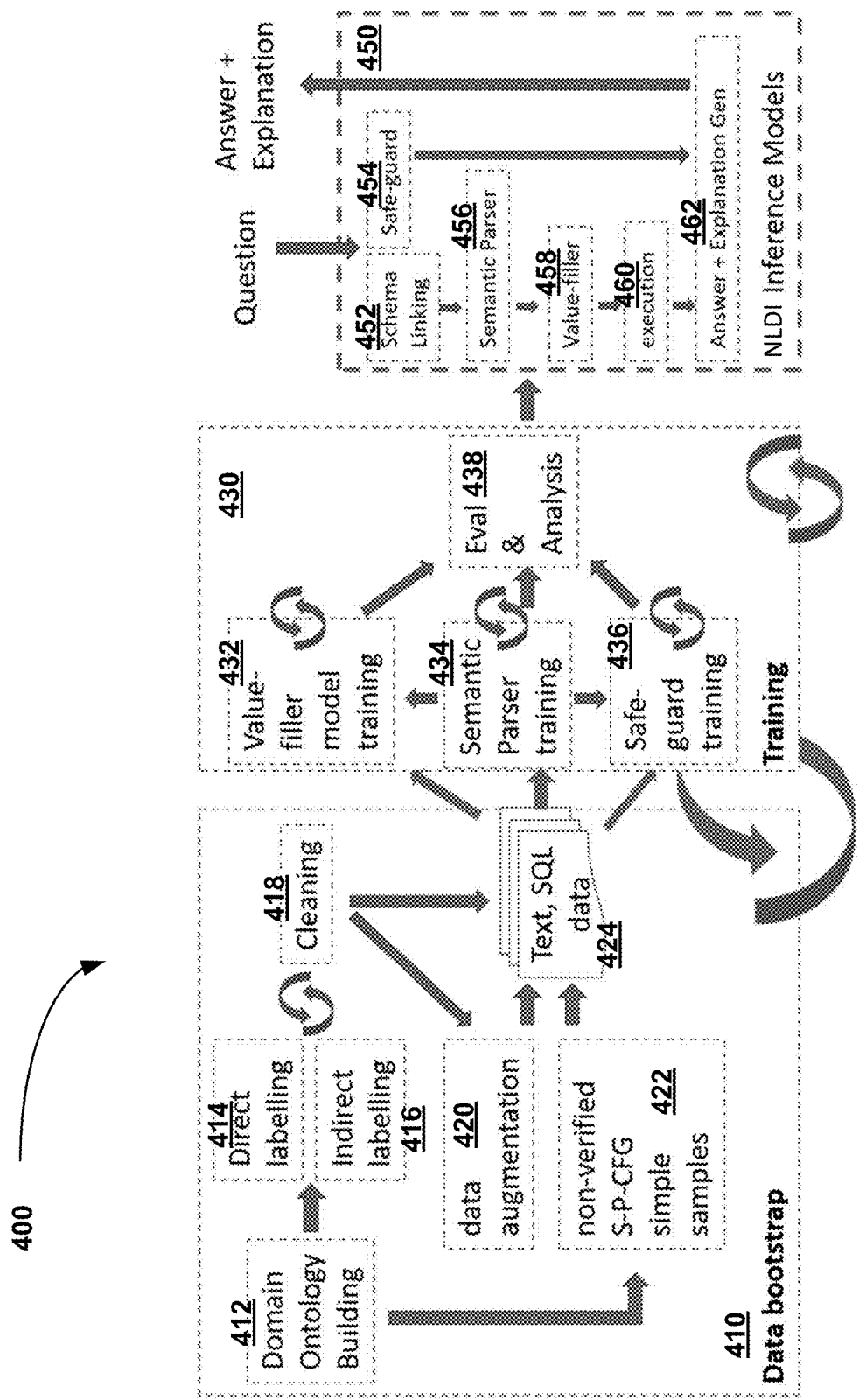
FIG. 4 illustrates an example of a process of building the overall natural language database system for a new domain, in accordance with some embodiments.

The data acquisition process of the natural language database system 100 can efficiently annotate and then augment the data required by the above components when there is no such data readily available in the domains of interest, so that the system can be built for new domains from scratch. FIG. 4 illustrates an example of a process 400 of building the overall natural language database system 100 for a new domain, in accordance with some embodiments. The process 400 comprises a data bootstrap sub-process 410, a training pipeline 430, and inference models 450.

The data bootstrap sub-process 410 comprises a domain ontology building unit 412, a direct labelling unit 414, an indirect labelling unit 416, a cleaning unit 418, a data augmentation unit 420, a non-verified S-P-CFG simple samples unit 422, and resulting text, SQL data 424.

As the starting point, an ontology 412 of the domain of interest is built, which includes database schema, schema descriptions and other necessary meta-data. The direct labelling 414 approach refers to experts labelling SQL queries given the questions and the database schema. The indirect labelling 416 approach refers to crowd-source workers rewriting machine generated canonical utterances for SQL queries sampled from a grammar. Further details are provided below. In some embodiments, the S-CFG may be adapted to a synchronous probabilistic context free grammar (S-P-CFG) to sample canonical utterances and SQL queries in parallel.

After initial labelling using the direct 414 and indirect 416 methods, there exist mislabelled data to be verified by human experts. Details regarding such data cleaning 418 are described below. In some embodiments, an algorithm may be developed to automatically tag examples that are most likely to be mislabelled.

After data cleaning 418, two types of data augmentation 420 techniques may be performed to produce additional in-domain parallel data between questions and SQL queries. Further details are described below. In some embodiments, context-free swaps of column names and values may be applied to produce clean in-domain data augmentation. In some embodiments, back-transition to paraphrase the existing questions may be leveraged to produce noisy in-domain data augmentation.

Simple samples 422 sampled from the S-P-CFG developed for indirect labelling may also be leveraged as a complement for the data augmentation 420. Those samples are by-products of the S-P-CFG with no additional cost, since they do not need to be verified manually.

In some embodiments, the system 100 may provide a cross-domain semantic parser that reaches the state-of-art performance due to an improved optimization strategy, improved encoder feature representation, and improved regularization.

In some embodiments, the system 100 may provide a safe-guard module 224 that detects out-of-domain and hard to answer questions for semantic parsing.

In some embodiments, the system 100 may provide an explanation system that describes the predicted query step-by-step, allowing the user to verify the system's 100 interpretation of the input question.

In some embodiments, the system 100 may provide a hybrid data acquisition process comprising direct 414 and indirect 416 labelling, data cleaning 418, and data augmentation 420.

In some embodiments, the system 100 may implement a method of leveraging monolingual SQL corpora to improve semantic parser accuracy.

Given the inputs and the ground-truth labels, standard training pipeline of deep neural models may be followed to train the semantic parser 456, the value filler 458 and the safe guard 454 with the PyTorch deep learning framework: (1) With maximum likelihood estimation (MLE), a forward pass may be performed on the models to calculate the objective function. (2) A backward pass may be performed to calculate the gradients of the model parameters through auto-differentiation. (3) The model parameters may be updated by the system 100 optimizer. Steps (1)-(3) may be repeated until the objective function converges.

Schema Linking 452

The goal of schema linking is to build relations between the natural language questions and the database schema, which is a pre-processing step for the semantic parser 456. In some embodiments, the schema linking 452 adds a couple of heuristics to address the low precision issue in the previous schema linking method.

Safe Guard 454

The responsibility of the safe guard module is two-fold: 1) to detect out-of-domain questions; 2) to detect hard-to-answer in-domain questions.

Value Filler 458

The value filler fills in the missing values of the SQL queries generated by the semantic parser, which is a post-processing step for the semantic parser.

Answer and Explanation Generator 462

This module produces the answers to the given questions and the corresponding explanations. The answers are obtained by executing the SQL queries against the database. The explanation generation relies on a synchronous context free grammar (SCFG) that produces canonical utterance (something that is almost plain English), which serve as the explanations to the given SQL queries. In some embodiments, the answer and explanation generator develops a synchronous context free grammar (S-CFG) which allows explanation generation with a given SQL query.

Semantic Parser 456

The backbone of the system is a neural semantic parser which generates an executable SQL query T given a user question Q and the database schema S. The system extends the state-of-the-art by generating executable SQL query instead of ignoring values in the SQL query, like many other top systems on the Spider leaderboard.

On the high-level, semantic parser 456 adopts the grammar-based framework with an encoder-decoder neural architecture. A grammar-based transition system is designed to turn the generation process of the SQL abstract syntax tree (AST) into a sequence of tree-constructing actions to be predicted by the parser. The encoder $f_{enc}$ jointly encodes both the user question $Q=q_1, \ldots, q_{|Q|}$ and database schema $S=\{s_1, \ldots, s_{|S|}\}$ consisting of tables and columns in the database. The decoder $f_{dec}$ is a transition-based abstract syntax decoder, which uses the encoded representation H to predict the target SQL query T. The decoder also relies on the transition system to convert the AST constructed by the predicted action sequences to the executable surface SQL query.

To alleviate unnecessary burden on the decoder, two modifications to the transition system are introduced to handle the schema and value decoding. With simple, but effective value-handling, inference and regularization techniques applied on this transition system, the execution accuracy may be pushed higher for better usability.

Figure 5:
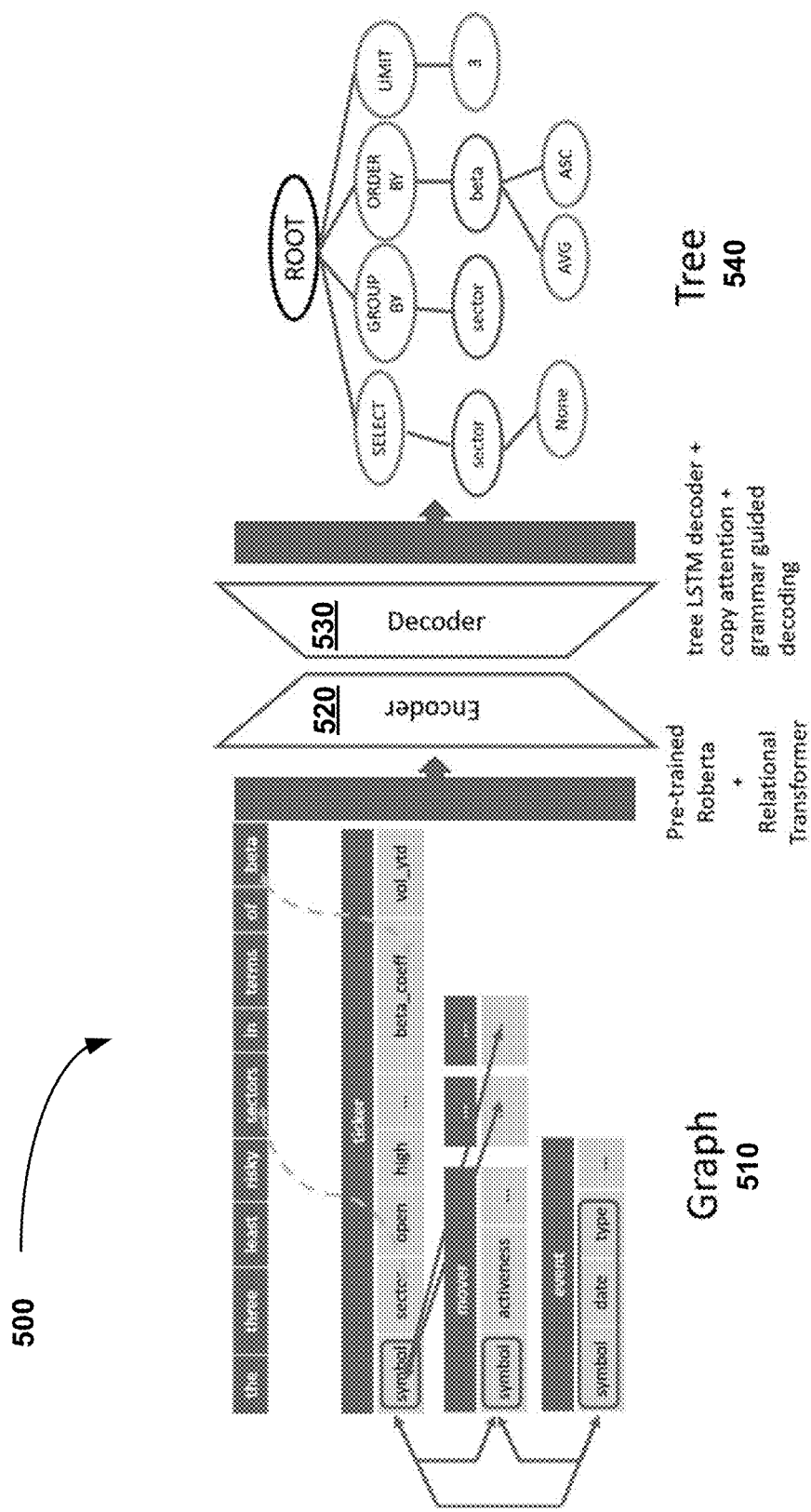
FIG. 5 illustrates an example of a semantic parser, in accordance with some embodiments.

FIG. 5 illustrates an example of a semantic parser 456, in accordance with some embodiments. The semantic parser 456 translates given natural language questions into SQL queries on the domains of interest, which is a component of the system 100. In some embodiments, the semantic processor 456 provides an improved optimization strategy for relational transformers to improve the accuracy and speed up the convergence, an improved encoder feature representations to better encode the inputs, improved regularization techniques to prevent overfitting, leverages beam-search optimization to reduce the gap between training and inference; and applies meta-learning algorithm (MAML) to help the semantic parser transfer to the domains of interest with fewer annotated data.

Given a schema S for a relational database, a goal is to translate the natural question Q to the target SQL T. Here the question $Q=q_1, \ldots, q_{|Q|}$ is a sequence of words, and the schema $S=\{s_1, \ldots, s_{|S|}\}$ comprises tables and their columns. $s \in S$ can be either a table name or a column name containing words $s_{i,1}, \ldots, s_{i,|s_i|}$. A directed graph 510 $G=\langle V, \varepsilon \rangle$ can be constructed to represent the relations between the inputs. Its nodes $V=Q \cup S$ include question tokens (each labeled with a corresponding token) and the columns and tables of the schema (each labeled with the words in its name). The edges $\varepsilon$ may be defined. The target SQL T is represented as an abstract syntax tree 540 in the context-free grammar of SQL.

For modeling text-to-SQL generation the encoder-decoder framework may be adopted. First, the encoder $f_{enc}$ embeds the inputs Q and S into joint representations $x_i$ for each column, table $s_i \in S$ and question word $q_i \in Q$. Along with the relational embeddings $r^k, r^v$ specified by G, the joint representations are passed into a sequence of L residual blocks of relational transformers. The decoder $f_{dec}$ uses the final outputs $y_i$ to estimate the distribution $Pr(T|Q,S,G)$ to predict the target SQLs. The whole model with the output softmax layer and all layer normalization blocks removed is denoted by $f(\cdot;\theta)$ and the loss function is denoted as L, where $\theta$ are all the learnable parameters.

Consider a set of inputs $X=\{x_i\}_{i=1}^n$ where $x_i \in \mathbb{R}^{d_x}$. A transformer, is a stack of self-attention layers where each layer (comprising H heads) transforms each $x_i$ into $y_i \in \mathbb{R}^{d_x}$ as follows:

$$e_{ij}^{(h)} = \frac{x_i q^{(h)} (x_j k^{(h)})^T}{\sqrt{d_z/H}}; \alpha_{ij}^{(h)} = \text{softmax}\{e_{ij}^{(h)}\} \quad (1)$$

$$z_i^{(h)} = \sum_{j=1}^n \alpha_{ij}^{(h)} x_j v^{(h)}; z_i = \text{Concat}(z_i^{(1)}, \ldots, z_i^{(H)})$$

$$\hat{y}_i = \text{LayerNorm}(x_i + z_i w^T)$$

$$y_i = \text{LayerNorm}(\hat{y}_i + FC(ReLU(FC(\hat{y}_i))))$$

where FC is a fully-connected layer, LayerNorm is layer normalization, $1 \leq h \leq H$, and $q^{(h)}, k^{(h)}, v^{(h)} \in \mathbb{R}^{d_x \times (d_z/H)}$, $w \in \mathbb{R}^{d_x \times d_z}$.

In order to bias the transformer toward some pre-existing relational features between the inputs, a relative position information may be represented in a self-attention layer by changing Equation 1 as follows:

$$e_{ij}^{(h)} = \frac{x_i q^{(h)} (x_j k^{(h)} + r_{ij}^k)^T}{\sqrt{d_z/H}} \quad (2)$$

$$z_i^{(h)} = \sum_{j=1}^n \alpha_{ij}^{(h)} (x_j v^{(h)} + r_{ij}^v)$$

Here the $r_{ij} \in \mathbb{R}^{d_z/H}$ terms encode the known relationship between two elements $x_i$ and $x_j$ in the input. This framework may be adapted to effectively encode the schema information for text-to-sql parsers.

Given a learning rate $\eta$, bounding the magnitudes of $\Delta G_l$ to be order of $\Theta(1/L)$ can make each SGD update bounded by $\Theta(\eta)$ per optimization step after initialization as $\eta \to 0$. That is, $\|\Delta f\| = \Theta(\eta)$, where $$\Delta f \triangleq f\left(\cdot; \theta - \eta \frac{\partial L}{\partial \theta}\right) - f(\cdot; \theta). \ \Theta(1/L)$$

bound can be obtained of the MLP blocks with appropriate initialization. Analogous initialization for vanilla transformer blocks whose inputs are randomly initialized may be derived. Such results may be adapted to the relational transformer blocks G whose inputs depend on pre-trained model weights, which can be written as:

$$G(x) = \text{softmax}\left(xq(kx+r^k)^T\right)(xv + r^{v\partial\partial\partial\partial})w \quad (3)$$

where the softmax operation is applied across the rows. Since the magnitude of the update is desired, $d_x = d_z = H = 1$ can be assumed without loss of generality. In this case, the projection matrices q, k, v, w reduce to scalars $q, k, v, w \in \mathbb{R}$. The input x and the relational embeddings $r^k$, $r^v$ are $n \times 1$ vectors. Following theorem can be proven:

Theorem 2.1 Assuming that $$\|\partial \mathcal{L} / \partial G_l\| = \Theta, \quad (1)$$

then $\Delta G_l \triangleq G_l\left(\eta \frac{\partial \mathcal{L}}{\partial x}; \theta_l - \eta \frac{\partial \mathcal{L}}{\partial \theta_l}\right) - G_l(x; \theta_l)$ satisfies $$\|\Delta G_l\| = \Theta(\eta/L)$$

when:

$$\|v\|^2 + \|r_i^v\|^2 + 2\|v\|\|r_i^v\| + 2\|w\|^2 = \Theta\left(\frac{1}{L}\right)$$

for all $i = 1, \ldots, n$;

$$\|x\| = \Theta(1).$$

Proof. Since the magnitude of the update is desired, $d_x = d_z = H = 1$ is assumed and layer index l is dropped without loss of generality. In this case, the projection matrices q, k, v, w reduce to scalars $q, k, v, w \in \mathbb{R}$. The input x and the relational embeddings $r^k$, $r^v$ are $n \times 1$ vectors. For a single query input $x' \in x$, the attention block is defined as follows:

$$G(x') = \text{softmax}\left(\frac{1}{\sqrt{d_x}} x'q(kx+r^k)^T\right)(xv + r^v)w =$$

$$\sum_{i=1}^{n} \frac{e^{x'q(kx_i+r_i^k)}}{\sum_{j=1}^{n} e^{x'q(kx_j+r_j^k)}}(x_i v + r_i^v)w \left(\frac{1}{\sqrt{d_x}} = 1\right)$$

Let $s_i = e^{x'q(kx_i+r_i^k)} / \sum_{j=1}^{n} e^{x'q(kx_j+r_j^k)}$ and $\delta_{ij} = 1$ if $i = j$ and 0 otherwise, then:

$$\frac{\partial G}{\partial k} = x'qw \sum_{i=1}^{n}(x_i v + r_i^v)s_i\left(x_i - \sum_{j=1}^{n} x_j s_j\right)$$

$$\frac{\partial G}{\partial q} = x'w \sum_{i=1}^{n}(x_i v + r_i^v)s_i\left(kx_i + r_i^k - \sum_{j=1}^{n}(kx_j + r_j^k)s_j\right)$$

$$\frac{\partial G}{\partial r_i^k} = x'qw\left(-(x_i v + r_i^v)s_i + \sum_{j=1}^{n}(x_j v + r_j^v)s_j\right)$$

$$\frac{\partial G}{\partial v} = w \sum_{i=1}^{n} x_i s_i$$

$$\frac{\partial G}{\partial w} = \sum_{i=1}^{n}(x_i v + r_i^v)s_i$$

$$\frac{\partial G}{\partial r_i^v} = ws_i$$

$$\frac{\partial G}{\partial x_i} = vws_i + w \sum_{j=1}^{n} \frac{\partial s_j}{\partial x_i}(x_j v + r_j^v)$$

When $x_i \neq x'$:

$$\frac{\partial s_j}{\partial x_i} = s_j(\delta_{ij} - s_i)x'qk$$

When $x_i = x'$:

$$\frac{\partial s_j}{\partial x_i} = q((1+\delta_{ij})kx_i + r_i^k)s_j - \sum_{t=1}^{n} q((1+\delta_{ij})kx_t + r_t^k)s_j s_t$$

Using Taylor expansion, the SGD update $\Delta G$ is proportional to the magnitude of the gradient:

$$\Delta G = \frac{\partial G}{\partial \theta_G}\Delta \theta_G + O(\|\theta_G\|^2) = -\eta \frac{\partial G}{\partial \theta_G}\frac{\partial G^T}{\partial \theta_G}\frac{\partial \mathcal{L}^T}{\partial G} + O(\eta^2)$$

$$= -\eta \frac{\partial \mathcal{L}}{\partial G}\left(\frac{\partial G}{\partial k}\frac{\partial G^T}{\partial k} + \frac{\partial G}{\partial q}\frac{\partial G^T}{\partial q} + \frac{\partial G}{\partial v}\frac{\partial G^T}{\partial v} + \frac{\partial G}{\partial w}\frac{\partial G^T}{\partial w} + \right.$$

$$\left. \sum_{i=1}^{n}\frac{\partial G}{\partial r_i^k}\frac{\partial G^T}{\partial r_i^k} + \sum_{i=1}^{n}\frac{\partial G}{\partial r_i^v}\frac{\partial G^T}{\partial r_i^v} + \sum_{i=1}^{n}\frac{\partial G}{\partial x_i}\frac{\partial G^T}{\partial x_i}\right) + O(\eta^2)$$

By the assumption that $$\left\|\eta \frac{\partial \mathcal{L}}{\partial G}\right\| = \Theta(\eta),$$

the term inside the main parentheses should be bound by $\Theta(1/L)$. The desired magnitude $\Theta(1/L)$ is smaller than 1 so terms with lower power are dominating. With $s_i \geq 0$ and $\Sigma s_i = 1$, the condition $\|x\| = \Theta(1)$ implies that the following terms have the lowest power inside the main parentheses:

$$\frac{\partial G}{\partial v}\frac{\partial G^T}{\partial v} = w^2\left(\sum_{i=1}^{n} x_i s_i\right)^2 = \Theta(\|w\|^2)$$

$$\frac{\partial G}{\partial w}\frac{\partial G^T}{\partial w} = \left(\sum_{i=1}^{n}(x_i v + r_i^v)s_i\right)^2 = \Theta(\|v\|^2) + 2\Theta(\|v\|\|r_i^v\|) + \Theta(\|r_i^v\|^2)$$

for all $i = 1, \ldots, n$ $$\sum_{i=1}^{n}\frac{\partial G}{\partial r_i^v}\frac{\partial G^T}{\partial r_i^v} = w^2 \sum_{i=1}^{n} s_i^2 = \Theta(\|w\|^2)$$

which immediately gives the result.

Suppose $f(\cdot; \theta)$ contains N layers of relational transformers, L should be 2N, since each layer of relational transformer has one attention block and one MLP block. Assuming $\|v\|=\|w\|=\|r^v\|$, the first condition can be satisfied with $$\|v\| = \|w\| = \|r^v\| = (6N)^{-\frac{1}{2}}.$$

However, unlike the cases in previous works, appropriate initialization is not enough to ensure the second condition during the early stage of the training. It is due to the fact that the input x depends on the pre-trained model weights instead of being initialized by ourselves. In order to circumvent this issue, an additional learnable mapping π may be added at the end of the encoder, and initialize π properly to make $\|x\|=\|\pi\tilde{x}\|=\Theta(1)$ instead, where $\tilde{x}$ is the original input without such a mapping. In some embodiments, an example of an initialization strategy may be described as follows:
1. Apply Xavier initialization for all parameters;
2. Do a forward pass on all the training examples and calculate the average input norm μ. Then scale π by 1/μ.
3. Inside each transformer layer, scale v, w, $r^v$ in the attention block and weight matrices in the MLP block by $$(6N)^{-\frac{1}{2}}.$$

Figure 6:
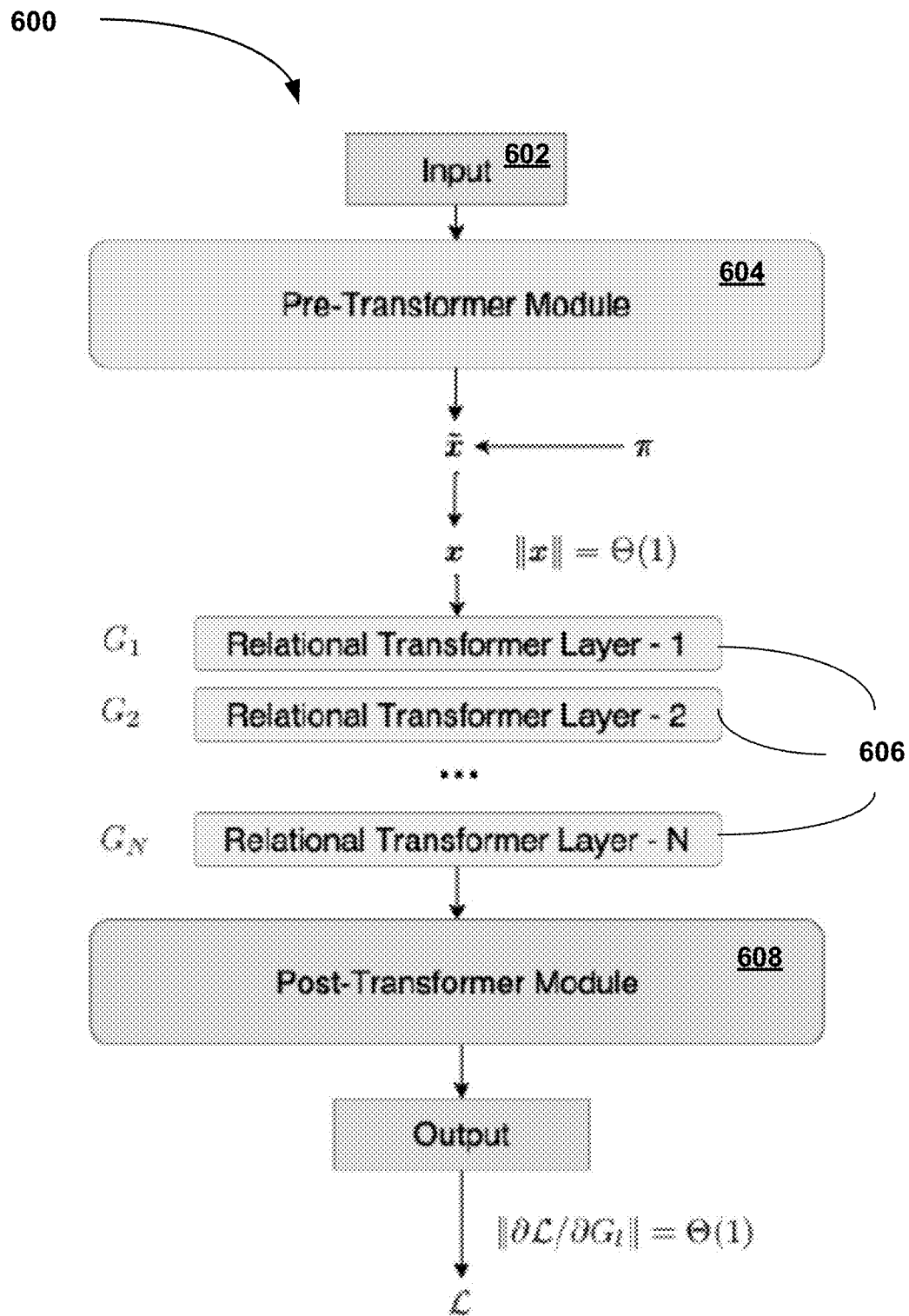
FIG. 6 illustrates, in a flowchart, an example of a method of an initialization strategy, in accordance with some embodiments.

FIG. 6 illustrates, in a flowchart, an example of a method of an initialization strategy 600, in accordance with some embodiments. This strategy can be applied on any task or neural architecture as illustrated in FIG. 6. The input 602 is first passed into a pre-transformer module 604 $f_{pre}$ to obtain the raw transformer input $\tilde{x}$. After multiplication with the linear mapping π, the normalized transformer input is fed into the stack of relational transformer layers 606, following a post-transformer module 608 $f_{post}$. Generally, $f_{pre}$ and $f_{post}$ can be any standard neural architecture paired with any loss function $\mathcal{L}$, which can be stably trained by a standard gradient optimization method such as Adam. In practice, there may be different π and μ for question input Q and schema input S. Another hyperparameter α may be added to control the degree of shrinkage on the initial weights by $$\alpha(6N)^{-\frac{1}{2}}.$$

After initialization, the layer normalization from all blocks are removed and the model is trained without warmup.

Relative Position and Relational Encodings in Transformers

Consider a set of inputs $X=[x_1, \ldots, x_n]$ where $x_i \in R^{d_x}$. A transformer is a stack of blocks, with each block consisting of a multi-head self-attention layer, layer normalizations, a multi-layer perceptron and skip connections. Each block (with one head in self-attention for notational simplicity) transforms each $x_i$ into $y_i \in R^{d_x}$ as follows:

$$\alpha_{ij} = \text{softmax}(x_i q(x_j k)^T / \sqrt{d_z}) \quad (4)$$

$$z_i = \sum_{j=1}^{n} \alpha_{ij} x_j v; \quad (5)$$

$$\tilde{y}_i = \text{LayerNorm}(x_i + z_i w^T) \quad (6)$$

$$y_i = \text{LayerNorm}(\tilde{y}_i + MLP(\tilde{y}_i)) \quad (7)$$

where the softmax operation is applied across the index j, MLP is a two-layer perceptron, Layer-Norm is a layer normalization layer, and $q,k,v \in R^{d_x \times d_z}, w \in R^{d_x \times d_z}$.

In order to bias the transformer toward some pre-existing relational features between the inputs, described a way to represent relative position information in a self-attention layer by changing Equation 4-5 as follows:

$$\alpha_{ij} = \text{softmax}\left(\frac{x_i q(x_j k + r_{ij}^k)^T}{\sqrt{d_z}}\right) \quad (8)$$

$$z_i = \sum_{j=1}^{n} \alpha_{ij}(x_j v + r_{ij}^v)$$

Here the $r_{ij} \in R^{d_z}$ terms encode the known relationship between two elements $x_i$ and $x_j$ in the input. This framework may be adapted to effectively encode the schema information using $r_{ij}$'s for Text-to-SQL parsers. The adapted framework is called a relation-aware transformer (RAT).

T-Fixup and its Limitations

The requirement for the warmup during the early stage training of the transformers comes from a combined effect of high variance in the Adam optimizer and backpropagation through layer normalization. Bounding the gradient updates would reduce the variance and make training stable, which can be achieved by appropriately initializing the model weights.

A weight initialization scheme called T-Fixup was derived for the vanilla transformer that fully eliminates the need for layer normalization and learning rate warmup, and stabilizes the training to avoid harmful plateaus of poor generalization. T-Fixup requires the inputs x to be Gaussian randomly initialized embeddings with variance $d^{-1/2}$ where d is the embedding dimension. Then, the input and parameters of the encoder, x, v, w in the vanilla self-attention blocks as well as the weight matrices in the MLP blocks defined in Eq. 4-7 are re-scaled by multiplying with a factor of $0.67N^{-1/4}$, where N are the number of transformer layers.

However, there are two restrictions of T-Fixup narrowing down the range of its application. First, T-Fixup is only designed for vanilla transformer but not other variants like the relative position or relation-aware version described previously. Second, they make the critical assumption that the inputs x can be freely initialized then scaled to the same magnitude as v, w and MLP weights. This renders the method inapplicable for the mixed setup where the inputs to the yet-to-be-trained transformer layers depend on the outputs from the pretrained models. The first issue can be addressed by re-deriving the scaling factor following the methodology of T-Fixup but taking into account the additional relational term. However, to lift the second restriction requires changing the assumption and more dramatic modification to the analysis.

The analysis framework of T-Fixup may be followed, but with the conditions derived to bound the gradient updates of the self-attention block in the presence of a pre-trained model. Based on the derivation, a data-dependent initialization strategy is proposed for the mixed setup of the new transformers on pre-trained encodings.

Applicable Architectures

The analysis applies to the general architecture type illustrated in FIG. 6, where the input passes through a pre-transformer, a main transformer, and a post-transformer module before outputting. The pre and post transformer modules can be any architectures that can be stably trained with Adam, including MLP, LSTM, CNN, or a pre-trained deep transformer module which can be stably fine-tuned with a learning rate significantly smaller than the main learning rate used for the main transformer module. For this work, the case of the main transformer containing only the encoder will be considered for simplicity, while a proposed decoder will be an LSTM which can be viewed as part of the post-transformer module. We extending the analysis to include a deep transformer decoder.

We use $f_e$ to denote the pre-transformer module (e for pre-trained encoder), and its parameters $\theta_e$; similarly $f_o$ for post-transformer module (o for output) with parameters $\theta_o$. The main transformer module $f_G$ is a stack of L transformer blocks, each consisting of a self-attention block and a MLP block. Let $G_l$, $l=1, \ldots, 2N$ denote individual self-attention or MLP layers in the blocks (Gl's do not include the skip connections), with parameters $\theta_l$ and let $L=2N$, $f_G$'s parameters are denoted by $\theta_G = \cup_{l=1}^{L} \theta_l$.

Theoretical Results for Stable Update

In an alternative for stable update, let the whole model with the output softmax layer(s) and all layer normalization blocks removed be denoted by $f(\cdot;\theta)$ and the loss function by L, where $\theta$ are all the learnable parameters. A condition is derived under which, per each SGD update with learning rate $\eta$, the model output changes by $\Theta(\eta)$, i.e. $\|\Delta f\|=\Theta(\eta)$ where $$\Delta f = f\left(\cdot; \theta - \eta \frac{\partial L}{\partial \theta}\right) - f(\cdot; \theta).$$

By Taylor expansion, the SGD update is:

$$\Delta f = \frac{\partial f}{\partial \theta_o} \Delta \theta_o + \frac{\partial f}{\partial \theta_G} \Delta \theta_G + \frac{\partial f}{\partial \theta_e} \Delta \theta_e + \qquad (9)$$

$$O(\|\theta_o\|^2 + \|\theta_G\|^2 + \|\theta_e\|^2)$$

$$= -\eta \left( \frac{\partial f_o}{\partial \theta_o} \frac{\partial f_o}{\partial \theta_o} \frac{\partial \mathcal{L}^T}{\partial f_o} + \right.$$

$$\frac{\partial f_o}{\partial f_G} \frac{\partial f_G}{\partial \theta_G} \frac{\partial f_G^T}{\partial \theta_G} \frac{\partial f_o}{\partial f_G} \frac{\partial \mathcal{L}^T}{\partial f_o} +$$

$$\left. \frac{\partial f_o}{\partial f_G} \frac{\partial f_G}{\partial f_e} \frac{\partial f_e}{\partial \theta_e} \frac{\partial f_e}{\partial \theta_e} \frac{\partial f_G^T}{\partial f_e} \frac{\partial f_o^T}{\partial f_G} \frac{\partial \mathcal{L}^T}{\partial f_o} \right) +$$

$$O(\eta^2)$$

$f_e$ and $f_o$ may be stably trained coupled with L, i.e, $$\left\|\frac{\partial \mathcal{L}}{\partial \theta_0}\right\| = \left\|\frac{\partial f_0}{\partial \theta_0}\right\| = \left\|\frac{\partial f_e}{\partial \theta_e}\right\| = \left\|\frac{\partial f_0}{\partial f_G}\right\| = \left\|\frac{\partial f_G}{\partial f_e}\right\| = \Theta, \qquad (1)$$

only the magnitudes of $$\frac{\partial f_G}{\partial \theta_G}$$

are bound in order to bound the overall SGD update. Since the magnitude of the update as it relates to the depth is desired, it can be assumed that all parameters are scalars, i.e, $q_l, k_l, v_l, w_l, r_l^k, r_l^v$ reduce to scalars $q_l, k_l, v_l, w_l, r_l^k, r_l^v \in R$. The next theorem states the condition under which, $$\frac{\partial f_G}{\partial \theta_G}$$

is bounded by $\Theta(1)$, achieving the overall $\|\Delta f\|=\Theta(\eta)$.

Theorem 1: Assuming $\|x\|=\Theta(\mu)$ for some $\mu \gg 1$, then $$\frac{\partial f_G}{\partial \theta_G} = \Theta(1) \text{ if } \|v_l\| = \|w_l\| = \|r_l^v\| = \Theta\left(\left((4\mu^2 + 2\mu + 2)N\right)^{-1/2}\right)$$

for all encoder layers l in relation-aware transformers; and $\|v_l\|=\|w_l\|=\Theta((4\mu^2 N)^{-1/2})$ in the case of vanilla transformers.

One immediate observation is that the scaling as the depth N is to the power of $-\frac{1}{2}$, whereas T-Fixup has a scaling with power of $-\frac{1}{4}$.

While this theorem is all needed for deriving a DT-Fixup approach, it is not immediately intuitive. So next, what it takes to bound the change in a individual layer output $\|\Delta G\|$ to $\Theta(\eta/L)$ in each gradient update is inspected. This will shine some light on the particular form of the expressions in Theorem 1:

Theorem 2 Let $x_l=[x_1^l, \ldots, x_n^l]$ be the input into l-th layer, and assume that $\|\partial L/\partial G\|=\Theta(1)$, i.e. the gradient signal from the layers above is bounded, then $$\Delta G_l = G_l\left(x_l - \eta \frac{\partial L}{\partial x_l}; \theta_l - \eta \frac{\partial L}{\partial \theta_l}\right) - G_l(x_l; \theta_l)$$

satisfies $\|\Delta G\|=\Theta(\eta/L)$ when for all i=1, . . . , n:

$$2\|v_l\|^2 \|x_i^l\|^2 + 2\|v_l\| \|r_l^v\| \|x_i^l\| + \|r_l^v\|^2 + \|w_l\|^2(1 + 2\|x_i^l\|^2) = \Theta(1/N) \qquad (10)$$

for relation-aware transformers. Alternatively, in the case of vanilla transformers:

$$\|v_l\|^2 \|x_i^l\|^2 + \|w_l\|^2 \|x_i^l\|^2 = \Theta(1/L) \qquad (11)$$

In this case, the proof is straightforward by taking partial derivatives of $G_l$ with respect to each parameter, and keep the terms with the lowest powers as they dominate the norm when the scale is smaller than one. The insight from this theorem is: if the input $x_l$ has the same norm as x, setting parameters $v_l, w_l, r_l^v$ to have the same norm and solve the equations would yield the scale factors in Theorem 1.

In T-Fixup, the corresponding condition to Eq. 11 keeps the term $\|v_l\|^2\|w_l\|^2$ which is dropped by the present teachings. It is due to the fact that T-Fixup assumes $\|x_i\|$ can be controlled to be the same scale as $v_l$ and $w_l$, so the lowest power terms (which are dominating the norms here) are the quartic (4th power) ones. For the present teachings, $\|x\|$ is treated separately by a constant to be estimated from data, so the lowest power terms are the quadratic ones in $v_l, w_l, r_l^v$ in Eq. 10 and 11, and $\|v_l\|^2\|w_l\|^2$ are dropped. Another important distinction from T-Fixup is that we assume the estimated $\|x\|$ to be much larger than the scale of $v_l$ and $w_l$, unlike the case when they are also controlled to be the same scale. As will be see next, these changes imply that the proposed method employs more aggressive scaling for initialization as compared to T-Fixup, and the assumption that $\|x\|$ has larger scale is satisfied naturally.

Proposed Method: DT-Fixup

Unlike previous works, appropriate initialization is not enough to ensure Eq. 10 and 11 during the early stage of the training. This is due to the fact that the input x often depends on the pre-trained model weights instead of being initialized. Empirically, it is observed that the input norm $\|x\|$ are relatively stable throughout the training but difficulty to control directly by re-scaling. Based on this observation, $\|x\|$ is treated as a constant and estimated by a forward pass on all the training examples as $\mu=\max_j[\|x_j\|]$. Then this estimated $\mu$ is used in the factors of Theorem 1 to obtain the scaling needed for initialization. Since parameters of all layers are initialized to the same scale, index l is dropped for brevity in this section. In practice, $\mu$ is on the order of 10 for pre-trained models, hence v, w and $r_i^v$ are naturally two orders of magnitude smaller. DT-Fixup is described as follows:

Apply Xavier initialization on all free parameters except loaded weights from the pre-training models;
Remove the learning rate warm-up and all layer normalization in the transformer layers,
except those in the pre-trained transformer;
Forward-pass on all the training examples to get the max input norm $\mu=\max_j[\|x_j\|]$;
Inside each transformer layer, scale v, w, $r^v$ in the attention block and weight matrices in the MLP block by $(N^*(4\mu^2+2\mu+2))^{-1/2}$ for relation-aware transformer layer; or scale v, w in the attention block and weight matrices in the MLP block by $N^{-1/2}/(2\mu)$ for vanilla transformer layer.

Transition System

In some embodiments, the transition system has four types of action to generate the AST, including (1) ApplyRule [r] which applies a production rule r to the latest generated node in the AST; (2) Reduce which completes the generation of the current node; (3) SelectColumn[c] which chooses a column c from the database schema S; (4) CopyToken[i] which copies a token $q_i$ from the user question Q.

There are two distinctions of the transition system with the previous systems. First, the transition system omits the action type SelectTable used by other transition-based semantic processor (SP) systems. This is made possible by attaching the corresponding table to each column, so that the tables in the target SQL query can be deterministically inferred from the predicted columns. Second, the value prediction is simplified by always trying to copy from the user question, instead of applying the GenToken[v] action which generates tokens from a large vocabulary or choose from a pre-processed picklist. Both of the changes constrain the output space of the decoder to ease the learning process, but the latter change unrealistically assumes that the values are always explicitly mentioned in the question. To retain the generation flexibility without putting excessive burden on the decoder, a conceptually simple but effective strategy to handle the values is used.

Handling Values

Value prediction is a challenging, but important component of NLDBs. However, only limited efforts are committed to handling values properly in the current cross-domain SP literature. Value mentions are usually noisy, if mentioned explicitly at all, requiring common sense or domain knowledge to be inferred. On the other hand, the number of possible values in a database can be huge, leading to sparse learning signals if the model tries to choose from the possible value candidates.

Instead of attempting to predict the actual values directly, the present SP simply learns to identify the input text spans providing evidence for the values. As mentioned earlier, the CopyToken action is introduced to copy an input span from the user question, indicating the clues for this value. The ground-truth CopyToken[i] actions are obtained from a tagging strategy based on heuristics and fuzzy string matching between the user question and the gold values. As a result, the decoder is able to focus on understanding the question without considering other complexities of the actual values which are difficult to learn. If the values are only implicitly mentioned in the user question, nothing is copied from the user question. The identification of the actual values is left to a deterministic search-based inference in post-processing, after the decoding process. This yields a simpler learning task as the neural network does not need to perform domain-specific text normalization such as mapping "female" to "F" for some databases.

Given the schema, the predicted SQL AST and the database content, the post-processing first identifies the corresponding column type (number, text, time), operation type (like, between, >, <, =, . . . ), and aggregation type (count, max, sum, . . . ). Based on these types, it infers the type and normalization required for the value. If needed, it then performs fuzzy-search in the corresponding column's values in the database. When nothing is copied, a default value is chosen based on some heuristics (e.g., when there exist only two element "Yes" and "No" in the column, the default value is "Yes"); otherwise, the most frequent element in the column is chosen. Searching the database content can also be restricted to a picklist for privacy reasons like previous works. Another benefit of this simple value handling strategy is the ease to explain.

Encoder 520

Following state-of-the-art text-to-sql parsers, an encoder $f_{enc}$ leverages pre-trained language models to obtain the input X to the relational transformers. First, the sequence of words in the question Q are concatenated with all the items (either a column or a table) in the schema S. In order to prevent the model leveraging potential spurious correlations based on the order of the items, the items in the schema are concatenated in random order during training. The concatenation is fed into the pre-trained language models and the last hidden states $x_i^{(q)}$ and $h_i = h_{i,1}, \ldots h_{i,|s_i|}$ are extracted for each word in Q and each item in S, respectively. For each item $s_i$ in the schema, an additional bidirectional LSTM (BiLSTM) is run over the hidden states of the words in its name $h_i$. Then, the sum of the average and the final hidden state of the BiLSTM as the schema representations $x_i^{(s)}$ are taken. The input X to the relational transformers is the set of all the obtained representations from Q∪S:

$$X = (x_1^{(q)}, \ldots, x_{|Q|}^{(q)}, x_1^{(s)}, \ldots, x_{|S|}^{(s)}).$$

In some embodiments, the encoder 520 ensures position invariance for the schema by shuffling s∈S, provides joint encoding process of the question Q and the schema S, provides improved feature representations as the inputs to the relational transformers, and/or provides explorations on different pre-trained language models for the encoding, including RobERTa and BERT.

The encoder 520, $f_{enc}$, maps the user question Q and the schema S to a joint representation $H=\{\phi_1^q, \ldots, \phi_{|Q|}^q\} \cup \{\phi_1^s, \ldots, \phi_{|Q|}^s\}$. It contextualizes the question and schema jointly through both the RoBERTA-Large model similar to, as well as through the additional sequence of 24 relation-aware transformer (RAT) layers. Tables are not predicted directly but inferred from the columns, so the column representations are augmented by adding the corresponding table representations after the encoding process.

Schema Linking

The goal of schema linking is to identify the implicit relations between Q and S. The relations are defined by whether there exist column/table references in the question to the corresponding schema columns/tables, given certain heuristics. Possible relations for each (i,j) where $x_i \in Q, x_j \in S$ (or vice versa) can be ExactMatch, PartialMatch, or NoMatch, which are based on name-based linking. Depending on the type of $x_i$ and $x_j$, the above three relations are further expanded to four different types: Question-Column, Question-Table, Column-Question, or Table-Question. Value-based linking may be used to augment the Exact-Match relation by database content and external knowledge. Furthermore, a couple of heuristics may be added to address the low precision issue we observed in the original schema linking method. In some embodiments, these heuristics ensure that over the same text span, higher quality links (e.g., exact match) override lower quality links (e.g., partial match). As a result, unnecessary noisy links are not considered by the semantic parser.

Decoder 530

A LSTM decoder $f_{dec}$ may be used to generate the action sequence A. Formally, the generation process can be formulated as $Pr(A|H)=\Pi_t PR(a_t|a_{<t},H)$ where H is the encoded representations outputted by the encoder $f_{enc}$. The LSTM state is updated: $m_t, h_t = f_{LSTM}([a_{t-1}||z_{t-1}||h_{p_t}||a_{p_t}||n_{p_t}], m_{t-1}, h_{t-1})$, where $m_t$ is the LSTM cell state, $h_t$ is the LSTM output at step t, $a_{t-1}$ is the action embedding of the previous step, $z_{t-1}$ is the context representation computed using multi-head cross-attention of $h_{t-1}$ over H, $p_t$ is the step corresponding to the parent AST node of the current node, and n is the node type embedding. For ApplyRule[r], $Pr(at=ApplyRule[r]|a_{<t}, H)=softmax_r(g(z_t))$ is determined where $g(\bullet)$ is a 2-layer MLP. For SelectColumn[c], the memory augmented pointer network may be used. For CopyToken[i], a pointer network is employed to copy tokens from the user question Q with a special token indicating the termination of copy.

For $f_{dec}$, a transition-based abstract syntax decoder may be employed. It uses a transition system to translate the surface SQL to an abstract syntax tree 540 and vice versa. The abstract syntax trees 540 can be constructed via sequential applications of actions, which are ground-truths to be predicted. There are three types of actions to generate the target SQL T, including (i) ApplyRule which applies a production rule to the last generated node; (ii) Reduce which completes a leaf node; (iii) SelectColumn which chooses a column from the schema. In some embodiments, in a transition system, each column is attached with their corresponding table so that the tables in the target SQL T can be directly inferred from the predicted columns. As a result, action SelectTable can be omitted from the generation.

Formally, the generation process can be formulated as $Pr(T|Y)=\Pi_t Pr(a_t|a_{<t},Y)$ where Y is the outputs of the last layer of the relational transformers. A LSTM may be used to model the generation process of the sequence of actions. The LSTM state is updated as $m_t, h_t=f_{LSTM}([a_{t-1}||z_{t-1}||h_{pt}||a_{pt}||n_{pt}], m_{t-1}, h_{t-1})$, where $m_t$ is the LSTM cell state, $h_t$ is the LSTM output at step t, $a_{t-1}$ is the action embedding of the previous step, $z_{t-1}$ is the context representation computed using multi-head attention on $h_{t-1}$ over Y, pt is the step corresponding to the parent AST node of the current node, and n is the node type embedding. For ApplyRule[R], $Pr(a_t=ApplyRule[R]|a_{<t}, y)=softmax_R(g(z_t))$ is computed, where $g(\bullet)$ is a 2-layer MLP. For SelectColumn, a memory augmented pointer network may be used.

In some embodiments, the decoder 530 includes implementing an expressive and realistic grammar which can cover most SQLs in the real-world applications.

In some embodiments, the decoder 530 includes improved design of a transition system, which converts surface codes to abstract syntax tree 540 and vice versa, to makes the action sequence shorter and eliminates the need of action SelectTable to ease the burden on the decoder.

In some embodiments, the decoder 530 includes a combination of multi-head attention and memory augmented pointer network to help improve column prediction.

Regularization and Variance Reduction

Besides using dropout employed on X and $z_t$ to help regularize the model, uniform label smoothing may further be employed on the objective of predicting SelectColumn. Formally, the cross entropy for a ground-truth column c* optimized becomes:

$$(1-\epsilon) * \log p(c^*) + \frac{\epsilon}{K} * \sum_c \log p(c)$$

where K is the number of columns in the schema, $\epsilon$ is the weight of the label smoothing term, and $p(\bullet) \triangleq Pr(a_t=SelectColumn[\bullet]|a_{<t}, y)$.

In addition, several directions may be explored and effective strategies may be proposed to further regularize the model against overfitting and reduce the model variance:

Instead of the uniform distribution used for label smoothing, leverage the distribution predicted by the model via cross-validation, which can achieve better regularization effect on the model.

For the semantic parser, the phenomenon of double descent may be observed. As the training steps are increased, the semantic parser can achieve better performance near the end of the training, which may be caused by the reduction of the variance of the over-parameterized deep models.

As a classic technique to reduce the model variance, a simple but effective ensemble strategy may be proposed to make majority vote on the predicted SQLs from models trained with different random seeds, which greatly boost the model performance.

The performance varies across different domains (i.e., different databases). To prevent the model from leveraging spurious features in a specific domain, an adversarial domain adaptation (ADA) method may be adopted to enforce that the model does not use the domain specific information during decoding.

A semantic parser may see much more questions than schemas. For example, in the Spider dataset, there are 10,181 questions but only 200 databases. Motivated by this, a column drop method was generated to randomly mask columns that do not appear by the ground truth SQL. Through the column drop method, the diversity of schemas that the semantic parser sees during training is increased.

Improving Accuracy Via Beam-Search Optimization

Semantic parsers training 434 is usually via maximum likelihood with teacher forcing, while inference is done via beam-search. This introduces a mismatch between training and inference time, and leads to potential performance drop. In particular, during training, the model never learns to correct a previously made mistake because it is always conditioned on ground truth partial sequence under teacher forcing. Beam search optimization (BSO) reduces this gap by performing beam search during training and penalizes bad samples from beam search. BSO was invented to tackle sequence learning tasks whose evaluation allows partial correctness. However, real-world semantic parsing requires the entire sequence to be correct, with no partial credit. The BSO algorithm may be modified to accommodate this harsher requirement. In particular, BSO only penalizes negative examples that are worse than ground-truth sequence by a predefined margin, whereas all negative examples may be penalized that are not ground-truth.

Safe Guard 454

The responsibility of the safe guard module is two-fold: first, to detect out-of-domain questions; second to detect hard-to-answer in-domain questions. These two goals are achieved by two classifiers separately, a K-nearest-neighbor classifier for out-of-domain detection trained on the questions from different domains; and a generalization success predictor trained on the binary labels of whether the semantic parser succeed on hold-out examples. The nearest neighbor classifier is completely disjoint from the semantic parser while the generalization predictor shares the encoder with semantic parser.

Explanation Generator 462

The goal of the explanation generation system is to unambiguously describe what the semantic parser understands as the user's command and allow the user to easily interpret the differences across the multiple hypotheses. Therefore, unlike a typical dialogue system setting where language generation diversity is essential, controllability and consistency are of primary importance. The generation not only needs to be 100% factually correct, but the differences in explanation also need to reflect the differences in the predicted SQLs, no more and no less. Therefore, a deterministic rule-based generation system is used instead of a neural model.

The explanation generator is a hybrid of two synchronous context-free grammar (SCFG) systems combined with additional heuristic post-processing steps. The two grammars trade off readability and coverage. One SCFG is shallow and simple, covering the most frequent SQL queries; the other is deep and more compositional, covering the tail of query distribution that the SP 456 can produce for completeness. The SCFG can produce SQL and English explanation in parallel. Given a SQL query, it is parsed under the grammar to obtain a derivation, which may then be followed to obtain the explanation text. At inference time, for a given question, if any of the SQL hypotheses cannot be parsed using the shallow SCFG, then the system moves on to the deep one.

Figure 7:
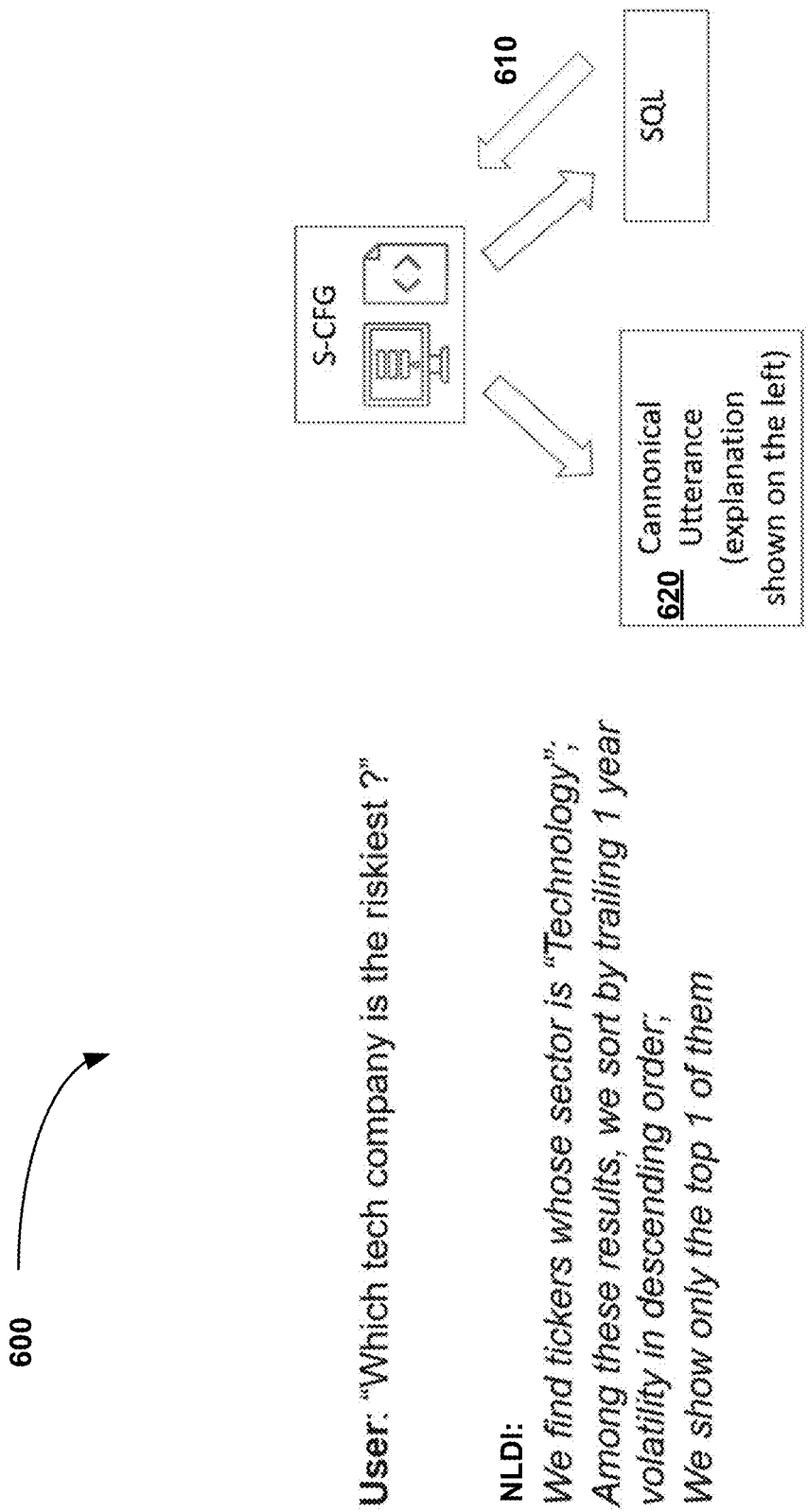
FIG. 7 illustrates an example of question and explanation, in accordance with some embodiments.

FIG. 7 illustrates an example of question and explanation 600, in accordance with some embodiments. FIG. 7 provides an illustration of how the explanation is produced. The explanation generation relies on a synchronous context free grammar (S-CFG) that produces pairs of canonical utterance (something that is almost plain English) and SQL, as shown in FIG. 7. The SCFG may be manually crafted. At its core, it is context free grammar that produces and manipulates shared abstract syntax tree (shared-AST)'s. A shared-AST represents both the semantics of the SQL query and its English explanation. By traversing the shared-AST in different orders using different specialized transformation functions that casts nodes to string representations, one may obtain the canonical utterance and SQL in parallel. In order to produce the explanation, the semantic parser's predicted SQL may be converted to the shared-AST representation 610, then convert it to the canonical utterance form 620.

Details of the Grammars

Using the deep SQL syntax trees allows almost complete coverage on the Spider domains. However, these explanations can be unnecessarily verbose as the generation process faithfully follows the re-ordered AST without: 1) compressing repeated mentions of schema elements when possible, and 2) summarizing tedious details of the SQL query into higher level logical concepts. Even though these explanations are technically correct, practical explanation should allow users to spot the difference between queries easily. To this end, the shallow grammar is design similarly to the template-based explanation system, which simplifies the SQL parse trees by collapsing large subtrees into a single tree fragment. In the resulting shallow parses production rules yield non-terminal nodes corresponding to: 1) anonymized SQL templates, 2) UNION, INTERSECT, or EXCEPT operations of two templates, or 3) a template pattern followed by ORDER-BY-LIMIT clause. In some embodiments, the shallow but wide grammar has 64 rules with those nonterminal nodes. The pre-terminal nodes are placeholders in the anonymized SQL queries such as Table name, Column name, Aggregation operator and so on. Finally, the terminal nodes are the values filling in the place holders. This grammar is that each high-level SQL template can be associated with an English explanation template that reveals the high level logic and abstracts away from the details in the concrete queries. To further reduce the redundancy, assumptions are made to avoid unnecessarily repeating table and column names. Table 1 showcases some rules from the shallow SCFG and one example of explanation. In practice, around 75% of the examples in the Spider validation set have all beam hypotheses from the SP 456 model parsable by the shallow grammar, with the rest handled by the deep grammar. In some embodiments, the deep grammar has less than 50 rules. However, since it is more compositional, it covers 100% of the valid SQLs that can be generated by the semantic parser. Some sample explanation by the deep grammar can be found in Table 2.

Finally, whenever the final value in the query differs from original text span due to post-processing, a sentence in the explanation states the change explicitly for clarity. For example, "'Asian' in the question is matched to 'Asia' which appears in the column Continent."

TABLE 1

Sample shallow grammar production rules and one example explanation.

S -> P
S -> P UNION P
P -> (SELECT <T_0>.<C_0> FROM <T_1> GROUP BY <T_2>.<C_1> HAVING <AOps_0> (

TABLE 1-continued

Sample shallow grammar production rules and one example explanation.

<T_3>.<C_2> ) <WOps_0> <L_0>, find the different values of the {<C_0>} in the {<T_1>} whose {<AOps_0>} the {<C_2>} {<WOps_0>} {<L_0>})
step 1: find the average of product price in the products table
step 2: find the different values of the product type code in the products table
   whose average of the product price is greater than the results of step 1

TABLE 2

Examples of explanation by the deep grammar. The first example also showcases the additional explanation for value post-processing.

Step 1: find the entries in the employee table whose age is less than 30.0.
Step 2: among these results, for each city of the employee table,
   where the number of records is more than 1, find city of the employee table.
"30" in the question is converted to 30.
"one" in the question is converted to 1.
Step 1: find combinations of entries in the employee table, the hiring table and the shop table
   for which employee id of the employee table is equal to employee id of the hiring table
   and shop id of the hiring table is equal to shop id of the shop table.
Step 2: among these results, for each shop id of the shop table,
   find the average of age of the employee table and shop id of the shop table.

Data Acquisition Process

The overall data acquisition process 410 is illustrated in FIG. 4. It comprises three stages of labelling 414, 416, cleaning 418 and augmentation 420.

Direct 414 and Indirect 416 Labelling

Figure 8:
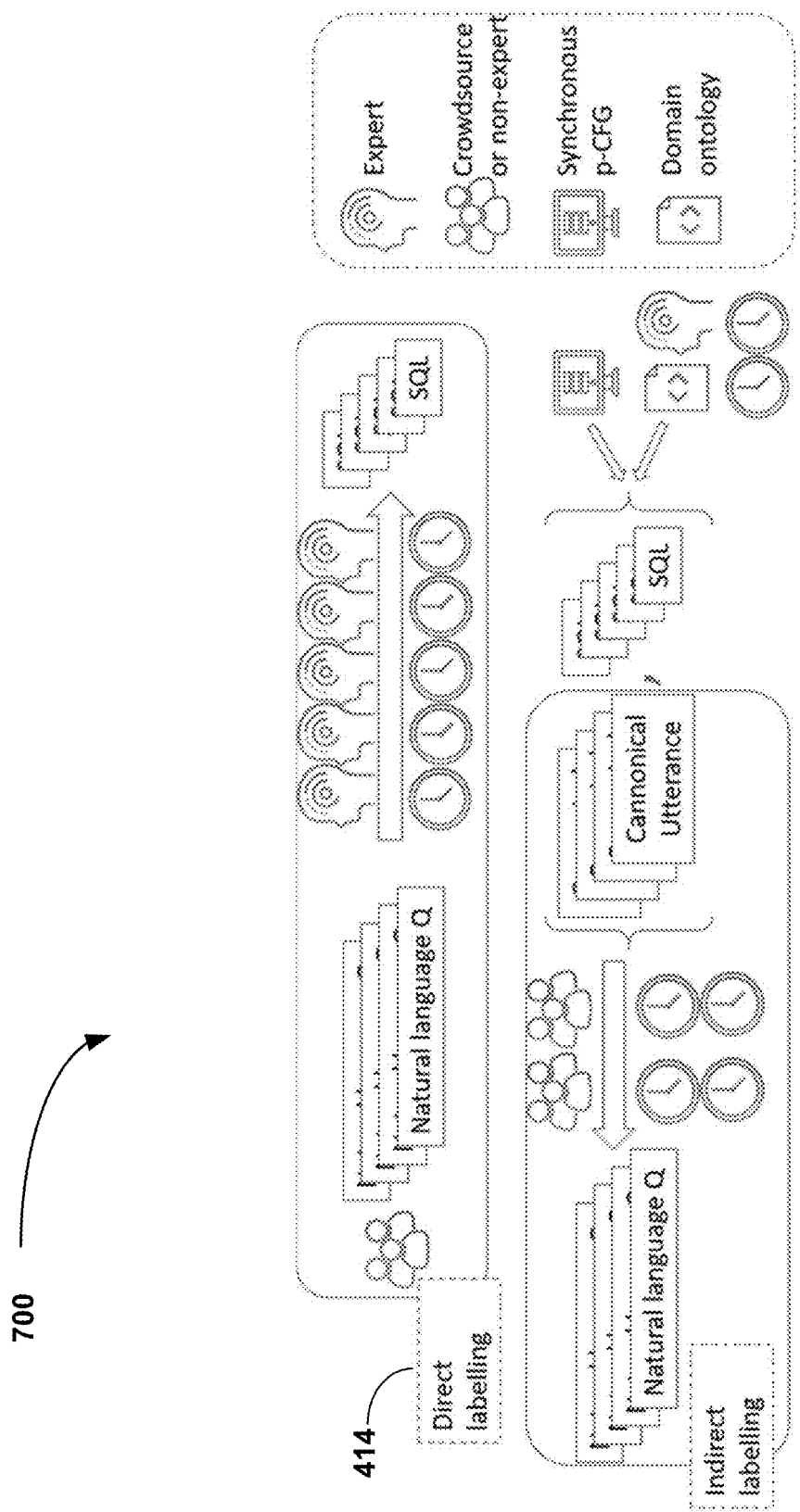
FIG. 8 illustrates an example of direct and indirect data labelling, in accordance with some embodiments.

FIG. 8 illustrates and example of direct and indirect data labelling 700, in accordance with some embodiments. The direct labelling 414 approach refers to experts labelling SQL queries given the questions and the database schema. This approach is not scalable because the experts need to know both SQL and have domain knowledge, rendering their time costly, as illustrated in the top portion of FIG. 8.

As a result, the indirect labelling 416 approach was developed to complement it. In this indirect method 416, the S-CFG described above is leveraged, and probabilities to its production rules are assigned, making it a synchronous probabilistic context free grammar (S-P-CFG). This SP-CFG is then sampled, producing a set of canonical utterances and SQL queries in parallel. The labelling task is then to rewrite the canonical utterances (explanations of the queries) into natural language questions. This does not require an expert who knows SQL since the canonical utterance is almost in plain English already so regular crowd-source workers with some knowledge of the domain can perform the rewrite task.

Column Label Smoothing

One of the core challenges for cross-domain SP is to generalize to unseen domains without overfitting to some specific domains during training. Empirically, it is observed that applying uniform label smoothing on the objective term for predicting SelectColumn[c] can effectively address the overfitting problem in the cross-domain setting. Formally, the cross-entropy for a ground-truth column c* we optimize becomes $$(1-\epsilon)*\log p(c^*) + \frac{\epsilon}{K} * \Sigma_c \log p(c),$$

where K is the number of columns in the schema, $\epsilon$ is the weight of the label smoothing term, and $p(\bullet), p(\bullet) \triangleq \Pr(a_t = \text{SelectColumn}[\bullet] | a_{<t}, H)$.

Weighted Beam Search

During inference, beam search may be used to find the high-probability action sequences. As mentioned above, column prediction is prone to overfitting in the cross-domain setting. In addition, value prediction is dependent on the column prediction, that is, if a column is predicted incorrectly, the associated value has no chance to be predicted correctly. As a result, two hyperparameters controlling influence based on the action types in the beam are introduced, with a larger weight $\alpha > 1$ for SelectColumn and a smaller weight $0 < \beta < 1$ for CopyToken.

Data Cleaning 418

Figure 9:
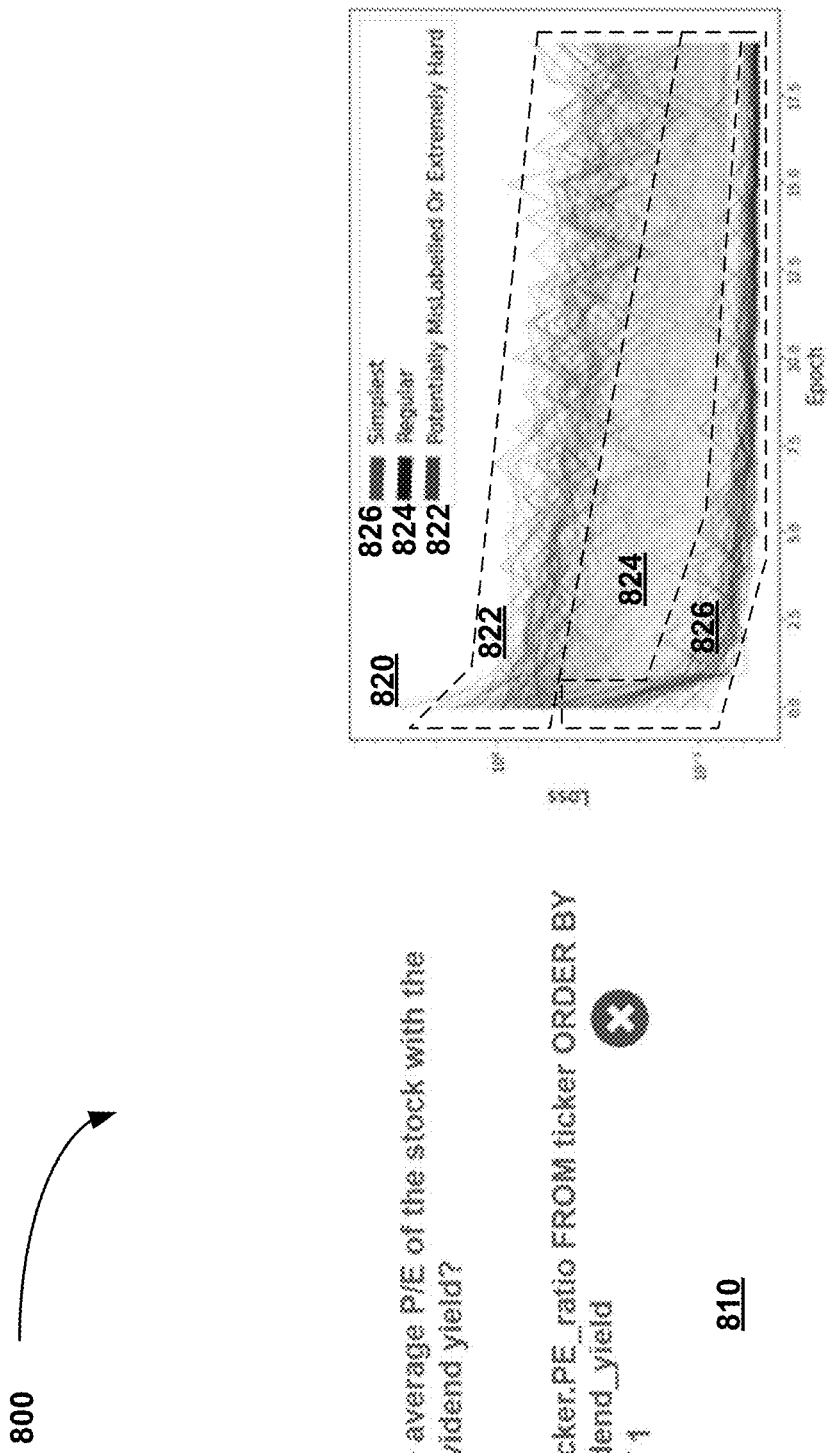
FIG. 9 illustrates an example of data cleaning, in accordance with some embodiments.

FIG. 9 illustrates an example of data cleaning 800, in accordance with some embodiments. After initial labelling using the direct 414 and the indirect 416 methods, human experts may verify the correctness of the annotations. This is performed because the overall dataset acquired is still small by deep learning standard, e.g., on the order of a few thousands rather than hundreds of thousands or higher. Therefore, it is paramount that the labels contain as little noise as possible. However, manual data cleaning is infeasible for such a hard structured output prediction datasets due to the difficulty for humans to reason about the labels at the first place. The example 810 shows a mislabelled case that is hard for human to catch if not paying close attention, because the "highest" should correspond to sort by "DESC" order based on the semantics of the values in that column. Hence, manually checking thousands of examples to catch various minute but consequential mistakes like this one is definitely not scalable. Instead, an algorithm was developed to automatically tag examples that are most likely to be mislabelled, which greatly cut down on what human experts need to manually verify and clean.

The intuition behind this algorithm is that if the semantic parsing model is trained on the noisy data, mislabelled examples require much more memorization by the model at the beginning phase of the optimization, because they contain exceptions to patterns seen in other clean examples. Therefore, if the per-example loss curve 820 is plotted, the curves at the top 822 correspond to examples that are either labelled incorrectly or very hard. Hence if the area under the curve during the transient phase of the optimization after the first epoch is calculated, this yields a score that can be used to sort the data points and surface the top suspects for label noise. After a human expert verifies and cleans the data, the optimization and sorting process may be repeated to surface additional examples until the top ones do not contain label noise anymore. The curves at the bottom 826 correspond to examples that are simplest, and the curves in the middle 824 correspond to examples that are regular.

Data Augmentation 420

Figure 10:
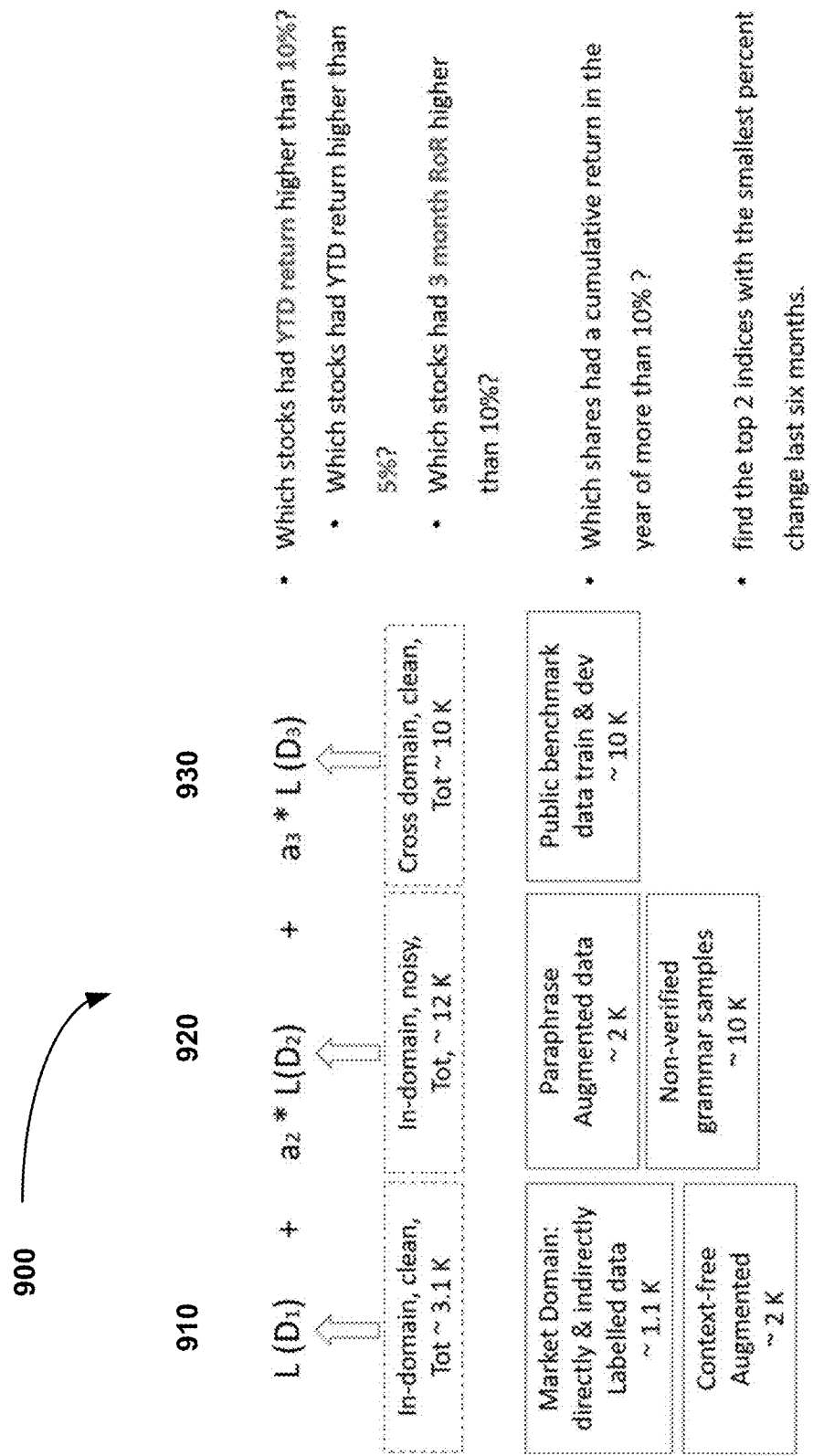
FIG. 10 illustrates an example of data augmentation, in accordance with some embodiments.

FIG. 10 illustrates an example 900 of data augmentation, in accordance with some embodiments. After data cleaning 418, the resulting parallel corpus between questions and SQL could still be too small, therefore, data augmentation 420 may be performed. There are two augmentation steps producing clean in-domain data, and noisy in-domain data, then the dataset is complemented with additional cross-domain clean datasets collected under different protocols. This forms the three groups of data shown 910, 920, 930. As they all have different characteristics, and are fed separately into the model training, with objective terms weighted differently to control their respective contribution.

The two types of augmentation are context-free swaps of column and values names as well as automatic paraphrasing of input-questions. The context-free swaps modify both the natural language questions as well as the corresponding SQL queries, and is only performed if the name of the column or values is a contiguous text-span. For column names, additional domain knowledge is used to ensure that only columns that are comparable in semantics are used for replacement. This ensures that the resulting example is still clean without manual verification. The automatic paraphrasing is done using back-translation with a number of different pivot languages, and produce noisy examples as the meaning is not guaranteed to be unchanged.

Leveraging Monolingual SQL Corpora

Beside data augmentation, monolingual SQL corpora was also leveraged to improve the semantic parser. A monolingual SQL corpus, as opposed to a parallel corpus, is one that contains only SQL statements, without the corresponding natural language questions. Such data is much cheaper to acquire and much more abundant. Hence, leveraging such data source is of significant practical implication.

To this end, the monolingual dataset is leveraged to improve the training of the decoder, by copying the target SQL's as source sentences and train the model jointly (i.e., an auto-encoding objective is used for the monolingual dataset). Note that the encoder parameters are optimized just through the original parallel corpus.

Let $\{X_i, Y_i\}$'s denote the parallel corpus, and $\{Y'_i\}$'s the monolingual corpus, and let $\theta$ and $\phi$ denote the encoder and decoder parameters respectively. So the final objective can be written as:

$$O = E_{p(X_i,Y_i)} T_{\theta,\phi}(Y_i|X_i) + \lambda E_{p(Y'_i)} T_{\phi}(Y'_i|Y'_i) \qquad (12)$$

While the synthetic source sentences, i.e., the SQLs, are not exactly aligned to authentic natural language source sentences, but were empirically found to be close enough to help training the decoder. This new objective can help the decoder to generate more fluent and grammatically correct sentences. Besides, part of semantic parsing task is about keeping the variable, function and attribute names where our auto-encoding objective can be useful for this purpose.

Note that this idea has never been used for semantic parsing. Given how different the sources and targets are in semantic parsing, as well as the dataset size being orders of magnitude smaller in semantic parsing compared to machine translation, it is not evident that this technique would be effective based on prior works. Furthermore, the original prior approach showed that adding noise to the copied sources improve performance, whereas the present disclosure finds that clean copied SQL work better for semantic parsing.

Quantitative Evaluations

Implementation Details. The DT-Fixup technique was applied to train the semantic parser 456 and mostly re-use the DT-Fixup hyperparamters. The weight of the column label smoothing term $\epsilon$ is 0:2. Inference uses a beam size of 5 for the beam search. The column weight was set as $\alpha=3$ and the value weight as $\beta=0:1$.

Dataset. The Spider dataset, a complex and cross-domain Text-to-SQL semantic parsing benchmark, which has 10; 180 questions, 5; 693 queries covering 200 databases in 138 domains was used. All experiments are evaluated based on the development set. The execution match with values (Exec) evaluation metrics was used.

Results on Spider. The natural language database interface system (NLDIS) was compared with the top systems on the Spider execution leaderboard that have published reports with execution accuracy on the development set as well. As seen from Table 3, the model outperforms the previous state of the art in terms of Exec accuracy on the development set.

TABLE 3

| Exec accuracy on the Spider development set. | |
|---|---|
| Model | Exec |
| GAZP + BERT | 59:2 |
| Bridge v2 + BERT | 68:0 |
| Bridge v2 + BERT (ensemble) | 70:3 |
| NLDIS + RoBERTa | 75:1 (best); 73:8_0:7 |

Spider Results

TABLE 4

| Accuracy on the Spider development and test sets, compared to other approaches at the top of the dataset leaderboard as of Sep. 18, 2020. | | |
|---|---|---|
| Model | Dev | Test |
| IRNet +++ XLNet | 65.5 | 60.1 |
| RYANSAL v2 + BERT | 70.6 | 60.6 |
| AuxNet + BART | 70.0 | 61.9 |
| RAT-SQL v3 + BERT | 69.7 | 65.6 |
| BOT-SQL + RobERTa (used infra) | 72.5 | |

Ablation Study. Table 5 shows an ablation study of various techniques in the natural language database interface. Removing the value post-processing decreases the accuracy, showing that copying alone is not enough due to the mismatch in linguistic variation and the schema specific normalization. The effectiveness of the proposed column label smoothing and weighted beam search are also reflected by the Exec accuracy on Spider. Furthermore, simply adding more hypotheses in the beam can boost the coverage of the correct predictions, leading to 4:5% accuracy gain over the top one accuracy. By combining all these techniques together, the natural language database interface system achieves an overall performance gain above 10% over the previous best single model system (68:0%).

TABLE 5

Ablation study on various techniques used in the natural language database interface system (Five runs with different random seeds)

| Model | Exec |
|---|---|
| NLDIS + RoBERTa | 73:8_0:7 |
| w/o. value post-processing | 67:2_0:8 |
| w/o. column label smoothing | 73:1_1:2 |
| w/o. weighted beam search | 73:5_0:7 |
| top 3 in the beam | 77:3_0:4 |
| top 5 in the beam | 78:3_0:3 |

Figure 11:
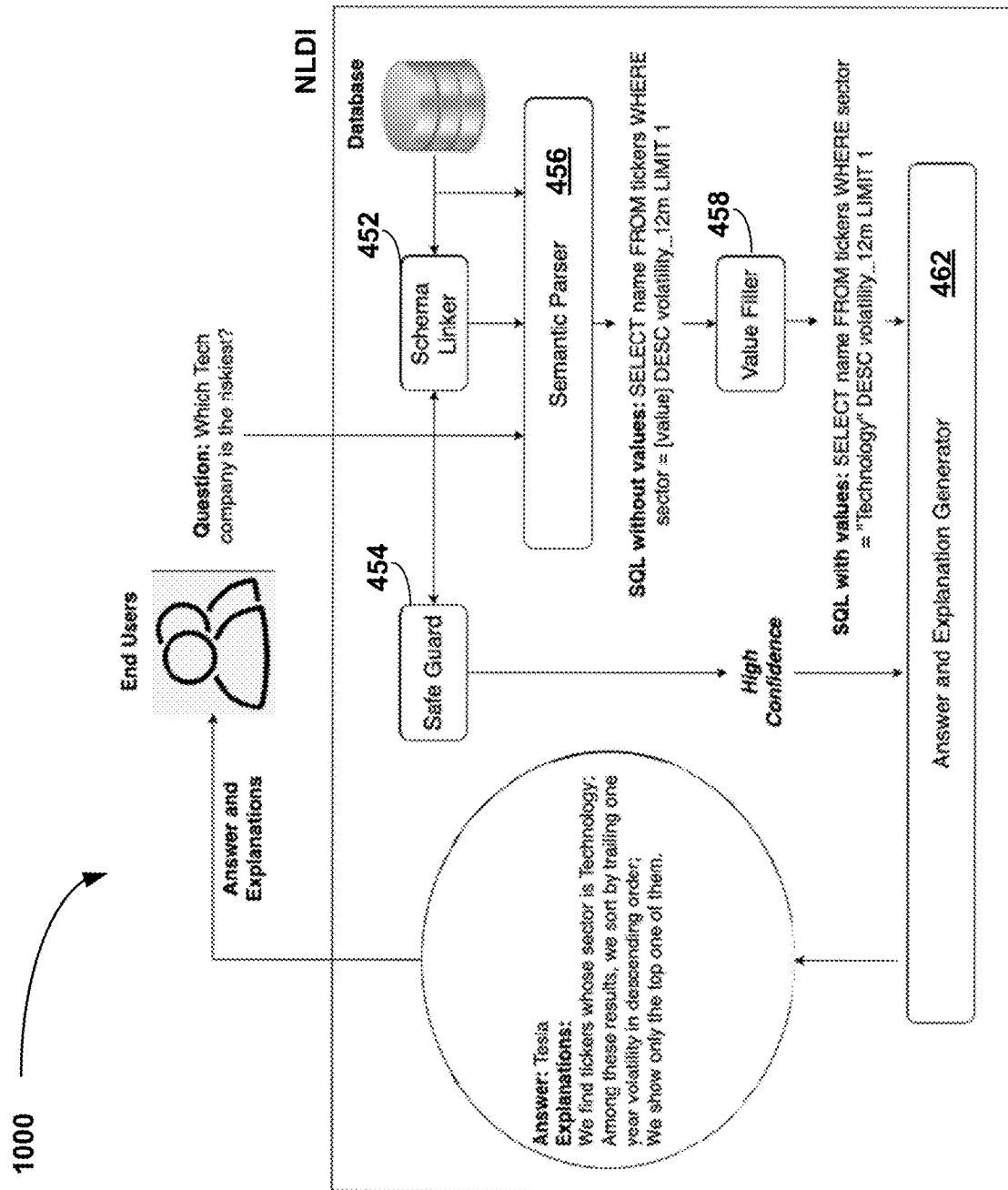
FIG. 11 illustrates a working example of the system, in accordance with some embodiments.

FIG. 11 illustrates a working example 1000 of the system 100, in accordance with some embodiments. An end user may ask, "Which Tech company is the riskiest?". The question is input into the semantic parser 456, together with information from the database and schema linker 452. The schema linker 452 receive information from the safe guard 454. The semantic parser 456 converts the question into a SQL without values:
SELECT name FROM tickers WHERE sector=[value] DESC volatility_12m LIMIT 1.
This is input into the value filler 458 to receive SQL with values:
SELECT name FROM tickers WHERE sector "Technology" DESC volatility_12m LIMIT 1.
This is input into the Answer and Explanation Generator 462 together with information from the safe guard. The Answer and Explanation Generator then outputs the Answer (e.g., Tesla) and Explanation (e.g., "We find tickers whose sector is Technology; Among these results, we sort by trailing one year volatility in descending order; We only show the top one of them." This output is displayed to the end user.

Figure 12:
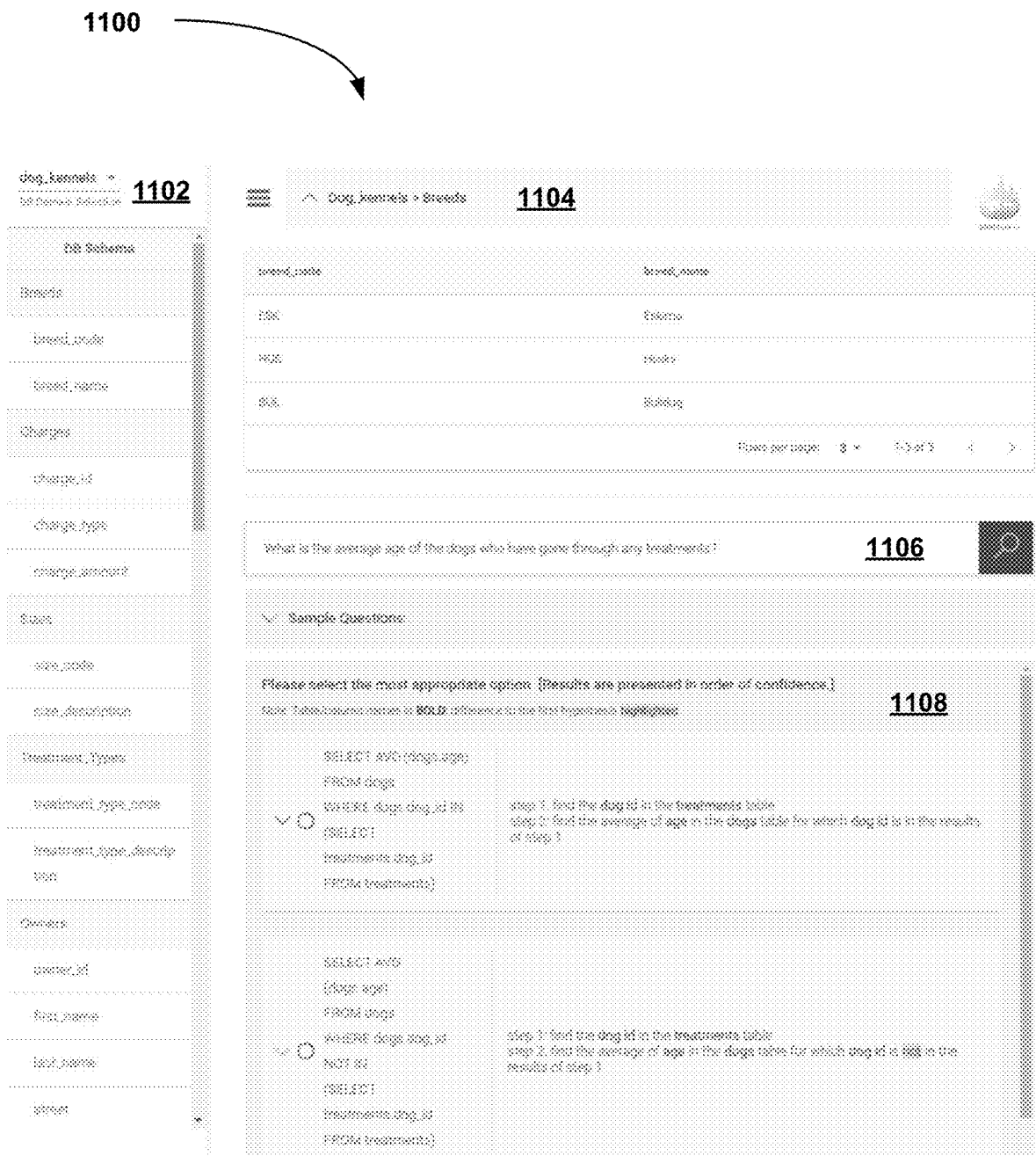
FIG. 12 illustrates, in a screenshot, an example of a natural language database interface system, in accordance with some embodiments.

FIG. 12 illustrates, in a screenshot, an example of a natural language database interface system 1100, in accordance with some embodiments. In this example, the user selected database "Dog kennels". The left 1102 and top 1104 panels show the database schema and table content. The user then entered "What is the average age of the dogs who have gone through any treatments?" in the search box 1106. This question is run through the semantic parser producing multiple SQL hypotheses from beam-search, which are then explained step-by-step as shown 1108. The differences across the hypotheses are highlighted. The tokens corresponding to table and columns are in bold. If there were more valid hypotheses, a "Show more" button would appear to reveal the additional ones.

In one example, the user question was translated into:
SELECT AVG (dogs.age)
FROM dogs
WHERE dogs.dog_id IN
(SELECT
Treatments dog_id
FROM treatments)
The explanation provided was:
Step 1: find the dog id in the treatment table
Step 2: find the average of age in the dogs table for which dog id is in the results of step 1.
In another example, the user question was translated into:
SELECT AVG
(dogs.age)
FROM dogs
WHERE dogs.dog_id
NOT IN
(SELECT
treatments.dog_id
FROM treatments)
The explanation provided was:
Step 1: find the dog id in the treatments table
Step 2: find the average of age in the dogs table for which dog id is NOT in the results of step 1

The above example results were presented in order of confidence. The table/column names were bolded. The different to the first hypotheses was highlighted (highlighting not shown; underlined in above explanation for the second sample result).

As shown in FIG. 12, the interface has two components: the database browser showing schema and selected database content, and the search panel where the users interact with the parser.

Behind the front-end interface, the system comprises an executable cross-domain semantic parser trained on Spider that maps user utterances to SQL query hypotheses, the SQL execution engine that runs the queries to obtain answers, and the explanation generation module that produces the explanation text and the meta-data powering explanation highlighting.

Executable Cross-database Semantic Parsing. Early NLDB systems use rule-based parsing and cannot handle the diversity of natural language in practice. Neural semantic parsing is more promising for coverage but is still brittle in real-world applications where queries can involve novel compositions of learned patterns. Furthermore, to allow plug-and-play on new databases, the underlying semantic parser may not be trained on in-domain parallel corpus but needs to transfer across domains in a zero-shot fashion.

Executable cross-database semantic parsing is even more challenging. Many of the previous work only tackle the cross-domain part, omitting the value prediction problem required for executable queries. Unlike the output space of predicting the SQL sketch or columns, the value prediction output space is much less constrained. The correct value depends on the source question, the SQL query, the type information of the corresponding column, as well as the database content. This complexity combined with limited training data in standard benchmark datasets like Spider makes the task very difficult. Some previous works directly learn to predict the values on WikiSQL, but does not generalize in cross-domain settings. On Spider, one may build a candidate list of values first and learn a pointer network to select from the list. The present natural language database interface system instead learns a pointer network to identify the input source span that provides evidence for the value instead of directly the value as previously described. Identification of the actual value is offloaded to post-processing. From a system perspective, it is also simpler for a power user of the NLDB to upload a domain-specific term description/mapping which can extend the heuristic-search-based value post-processing instantly rather than relying on re-training.

Query Explanation. Explaining structured query language has been studied in the past. Full NLDB systems can leverage explanations to correct mistakes with user feedback, or to prevent mistakes by giving clarifications. However, these methods can only handle cases where the mistake or ambiguity is about the table, column, or value prediction. There is no easy way to resolve structural mistakes or ambiguities if the query sketch is wrong. The present natural language database interface system, on the other hand, offers the potential to recover from such mistakes if the correct query is among the top beam results. This is an orthogonal contribution that could be integrated with other user-interaction modes. Finally, the NaLIR system has a similar feature allowing the user to pick from multiple interpretations of the input question. However, NaLIR's interpretation is based on syntactical parses of the question rather than interpreting the final semantic parses directly. A rule-based semantic parser then maps the selected syntactic parse to SQL. As the syntactic parse is not guaranteed to be mapped to the correct SQL, this interpretation does not completely close the gap between what the NLDB performs and what the user thinks it does.

In the present disclosure, a natural language interface to databases (NLDB) that is accurate, interpretable, and works on a wide range of domains is presented. The system explains its actions in natural language so that the user can select the right answer from multiple hypotheses, capitalizing on the much higher beam accuracy instead of top-1 accuracy. The natural language database interface system provides a complementary way to resolve mistakes and ambiguities in NLDB.

Figure 13:
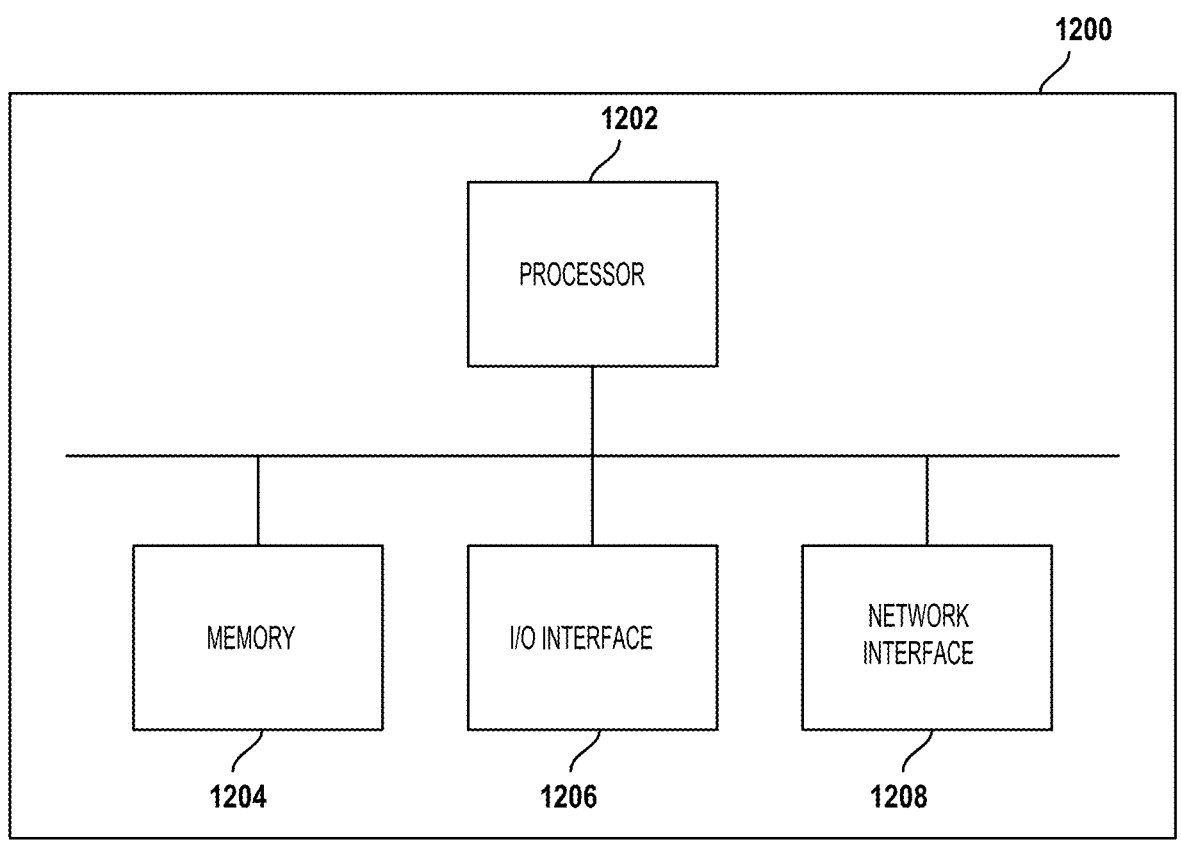
FIG. 13 is a schematic diagram of a computing device such as a server.

FIG. 13 is a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a suitable combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for answering a natural language question, the system comprising:
   at least one processor; and
   a memory comprising instructions which, when executed by the processor, configure the processor to:
   receive a natural language question;
   generate, using a neural network architecture having an encoder and a decoder, an executable SQL query based on the natural language question, wherein the SQL query is represented as an abstract syntax tree generated from a sequence of tree-constructing actions predicted by the neural network architecture, the abstract syntax tree generated based on a database schema and a plurality of words in the natural language question;
   generate using a shallow synchronous context-free grammar system architecture and a deep synchronous context-free architecture, a natural language explanation of the executable SQL query which is used to find a solution to the natural language question from a database; and
   present the solution and the natural language explanation.

2. The system as claimed in claim 1, wherein the at least one processor is configured to send the SQL query to the database.

3. The system as claimed in claim 1, wherein the at least one processor is configured to receive the solution from the database.

4. The system as claimed in claim 1, wherein the at least one processor is configured to determine if the question is out-of-domain or hard-to answer.

5. The system as claimed in claim 1, wherein the at least one processor is configured to translate the natural language question into the SQL query based on a directed graph constructed to represent relationships between the plurality of words.

6. A method of answering a natural language question, the method comprising:
 receiving a natural language question;
 generating, using a neural network architecture having an encoder and a decoder, an executable SQL query based on the natural language question, wherein the SQL query is represented as an abstract syntax tree generated from a sequence of tree-constructing actions predicted by the neural network architecture, the abstract syntax tree generated based on a database schema and a plurality of words in the natural language question;
 generating, using a shallow synchronous context-free grammar system architecture and a deep synchronous context-free grammar system architecture, a natural language explanation of the executable SQL query which is used to find a solution to the natural language question from a database; and
 presenting the solution and the natural language explanation.

7. The method as claimed in claim 6, comprising sending the SQL query to the database and receiving the solution from the database.

8. The method as claimed in claim 6, comprising determining if the question is out-of-domain or hard-to answer.

9. The method as claimed in claim 6, comprising translating the natural language question into the SQL query based on a directed graph constructed to represent relationships between the plurality of words.

10. A system for answering a natural language question, the system comprising:
 at least one processor; and
 a memory comprising instructions which, when executed by the processor, configure the processor to:
 receive a natural language question; and
 when the question is not out-of-domain and not hard-to answer:
 generate, using a neural network architecture having an encoder and a decoder, an executable SQL query based on the natural language question, wherein the SQL query is represented as an abstract syntax tree generated from a sequence of tree-constructing actions predicted by the neural network architecture, the abstract syntax tree generated based on a database schema and a plurality of words in the natural language question;
 generate, using a shallow synchronous context-free grammar system architecture and a deep synchronous context-free grammar system architecture, a natural language explanation of the executable SQL query which is used to find a solution to the natural language question from a database; and
 present the solution and the natural language explanation.

11. The system as claimed in claim 10, wherein the at least one processor is configured to send the SQL query to the database.

12. The system as claimed in claim 10, wherein the at least one processor is configured to receive the solution from the database.

13. The system as claimed in claim 10, wherein the at least one processor is configured to determine if the question is out-of-domain or hard-to answer.

14. The system as claimed in claim 10, wherein the at least one processor is configured to translate the natural language question into the SQL query based on a directed graph constructed to represent relationships between the plurality of words.

15. A method of answering a natural language question, the method comprising:
 receiving a natural language question; and
 when the question is not out-of-domain and not hard-to answer:
 generating, using a neural network architecture having an encoder and a decoder, an executable SQL query based on the natural language question, wherein the SQL query is represented as an abstract syntax tree generated from a sequence of tree-constructing actions predicted by the neural network architecture, the abstract syntax tree generated based on a database schema and a plurality of words in the natural language question;
 generating, using a shallow synchronous context-free grammar system architecture and a deep synchronous context-free grammar system architecture, a natural language explanation of the executable SQL query which is used to find a solution to the natural language question from a database; and
 presenting the solution and the natural language explanation.

16. The method as claimed in claim 15, comprising sending the SQL query to the database.

17. The method as claimed in claim 15, comprising receiving the solution from the database.

18. The method as claimed in claim 15, comprising determining if the question is out-of-domain or hard-to answer.

19. The method as claimed in claim 15, comprising translating the natural language question into the SQL query based on a directed graph constructed to represent relationships between the plurality of words.

20. The method as claimed in claim 6, comprising:
 generating a plurality of executable SQL queries based on the natural language question;
 generating an explanation for each SQL query of the plurality of executable SQL queries based on the natural language question, wherein the explanation for each SQL query of the plurality of executable SQL queries reflects differences between each SQL query of the plurality of executable SQL queries;
 selecting a SQL query of the plurality of executable SQL queries to be a solution to the natural language question, and
 presenting the solution and the explanation for the SQL query corresponding to the solution.

\* \* \* \* \*